(12) United States Patent
Damewood et al.

(10) Patent No.: US 12,314,418 B2
(45) Date of Patent: May 27, 2025

(54) DIFFERENTIALLY PRIVATE SECURITY SYSTEM USING GAUSSIAN NOISE AND DYNAMIC STEP SIZE

(71) Applicant: Snowflake Inc., Bozeman, MT (US)

(72) Inventors: Liam James Damewood, Millbrae, CA (US); Oana Niculaescu, San Francisco, CA (US); Alexander Rozenshteyn, Montvale, NJ (US); Mikhail Rudoy, San Francisco, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/497,648

(22) Filed: Oct. 30, 2023

(65) Prior Publication Data
US 2025/0021680 A1    Jan. 16, 2025

Related U.S. Application Data

(60) Provisional application No. 63/513,226, filed on Jul. 12, 2023.

(51) Int. Cl.
*G06F 21/62*   (2013.01)
*G06F 16/2457*   (2019.01)

(52) U.S. Cl.
CPC .... *G06F 21/6218* (2013.01); *G06F 16/24575* (2019.01); *G06F 21/6227* (2013.01)

(58) Field of Classification Search
CPC ........... G06F 21/6245; G06F 18/24155; G06F 21/60; G06F 21/64; G06F 21/602; G06F 16/2255; G06F 21/577; G06F 30/20; G06F 30/27; G06F 18/29
See application file for complete search history.

(56) References Cited

U.S. PATENT DOCUMENTS

| | | | | |
|---|---|---|---|---|
| 11,328,084 B2* | 5/2022 | Damewood | ......... | G06F 21/6227 |
| 11,861,032 B2* | 1/2024 | Damewood | ........... | G06F 16/245 |
| 12,105,832 B2* | 10/2024 | Damewood | ......... | G06F 21/6245 |
| 2021/0256151 A1* | 8/2021 | Damewood | ......... | G06F 21/6245 |
| 2022/0229931 A1 | 7/2022 | Damewood et al. | | |

(Continued)

OTHER PUBLICATIONS

Damewood, Liam, "A Framework For Differentially Private Adaptive Algorithms", Leap Year Technologies, (Feb. 11, 2020), 17 pages.

*Primary Examiner* — Jerry B Dennison
(74) *Attorney, Agent, or Firm* — Schwegman Lundberg & Woessner, P.A.

(57) ABSTRACT

Example differential privacy techniques include receiving a request to perform a query on a set of data stored by a database. The request identifies a target accuracy and a maximum privacy spend. The target accuracy includes a maximum relative error. The maximum privacy spend includes a value of a zero-concentrated privacy parameter $\rho$ associated with a degree of information released about the set of data due to the query. A differentially private count operation is performed on the set of data to produce a differentially private result. The differentially private count operation includes performing a count operation on data to produce a result and perturbing the result to produce a differentially private result using a noise value sampled from a Gaussian distribution and based on a fractional privacy spend comprising a fraction of the maximum privacy spend. The differentially private result is encoded for transmission to the client device.

24 Claims, 13 Drawing Sheets

(56) References Cited

U.S. PATENT DOCUMENTS

2023/0075097 A1\* 3/2023 Demidov ................ G10L 15/22
2023/0205917 A1\* 6/2023 Chalk ................. G06F 21/6245
                                                              726/30
2025/0021680 A1\* 1/2025 Damewood ......... G06F 21/6227

\* cited by examiner

| ENTRY # | FEATURE 1 (HEIGHT, CM) | FEATURE 2 (RESIDENCE) |
|---|---|---|
| 1 | 163 | ITALY |
| 2 | 136 | ENGLAND |
| 3 | 180 | FRANCE |
| 4 | 207 | USA |
| 5 | 188 | CHINA |
| 6 | 145 | FRANCE |
| 7 | 169 | KOREA |
| 8 | 158 | USA |

| FEATURE 10 (AGE) | FEATURE 11 (DISEASE) |
|---|---|
| 37 | 0 |
| 87 | 0 |
| 54 | 1 |
| 34 | 0 |
| 18 | 0 |
| 13 | 1 |
| 65 | 1 |
| 17 | 1 |

DIFFERENTIALLY PRIVATE SECURITY SYSTEM USING GAUSSIAN NOISE AND DYNAMIC STEP SIZE

PRIORITY CLAIM

This application claims the benefit of priority to the U.S. Provisional Patent Application 63/513,226, filed Jul. 12, 2023, and entitled "DIFFERENTIALLY PRIVATE SECURITY SYSTEM USING GAUSSIAN NOISE AND DYNAMIC STEP SIZE," which application is incorporated herein by reference in its entirety.

TECHNICAL FIELD

Embodiments of the disclosure generally relate to databases and, more specifically, to increasing differentially private database performance by bounding database query privacy spend using a differentially private security system based on Gaussian noise and dynamic step size.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Different database storage systems may be used for storing different types of content, such as bibliographic, full text, numeric, and/or image content. Further, in computing, different database systems may be classified according to the organizational approach of the database. There are many different types of databases, including relational databases, distributed databases, cloud databases, object-oriented databases, and others.

Data about people, such as health data, financial records, location information, web browsing, and viewing habits, is valuable for analysis and collaboration. There are many technologies in which statistical or predictive analysis of personal data is beneficial. For example, medical research institutions use medical information about populations of individuals to support epidemiologic studies. Map providers use location information gathered from mobile devices carried by people to determine traffic information and provide routing guidance. Technology companies collect information describing the behaviors of Internet users to improve their offerings, such as by redesigning user interfaces to improve human-computer interactions, making improved recommendations, and offering sponsored messages.

However, the personal nature of this data limits its usefulness. Government regulations provide strict rules about how personal data can be collected, used, and shared. Individuals also have expectations about how their personal data will be used and may react negatively if it is publicly disclosed. As a result, companies that collect and maintain personal data seek ways to extract value from it without running afoul of such rules and expectations.

One set of techniques for using personal data involves removing personally identifiable information from the data through masking, hashing, anonymization, aggregation, and tokenization. These techniques tend to be resource-intensive and may compromise analytical utility. For example, data masking may remove or distort data, compromising the statistical properties of the data. These techniques also often fail to protect individual privacy.

An additional technique makes use of differential privacy. Differential privacy is a technology that injects noise into results provided by statistical databases to protect private information. Within this technological space, issues arise over how to evaluate the privacy impact of the injected noise. The answer can be complex due to the potential resources available to determined adversaries (e.g., the computing power available to a potential attacker trying to gain access to the private data), the resources (e.g., computing power) available to the database, and the types of queries supported by the database.

A differentially private system provides differentially private results in response to database queries. The amount of private information provided by the system may depend, in part, on a "privacy budget" that describes the amount of privacy that may be "spent" to retrieve information from the database. The differentially private system needs to calculate privacy spend correctly because it directly impacts the analytical utility of the information in the database. It is likewise essential for the system to minimize privacy spend to the extent possible to provide a privacy budget for additional queries for the same reason.

BRIEF DESCRIPTION OF THE DRAWINGS

The present disclosure will be understood more fully from the detailed description given below and from the accompanying drawings of various embodiments of the disclosure.

FIG. 5 illustrates an example data structure that can be processed by the differentially private security system of FIG. 4, in accordance with some embodiments.

DETAILED DESCRIPTION

Figure 1:
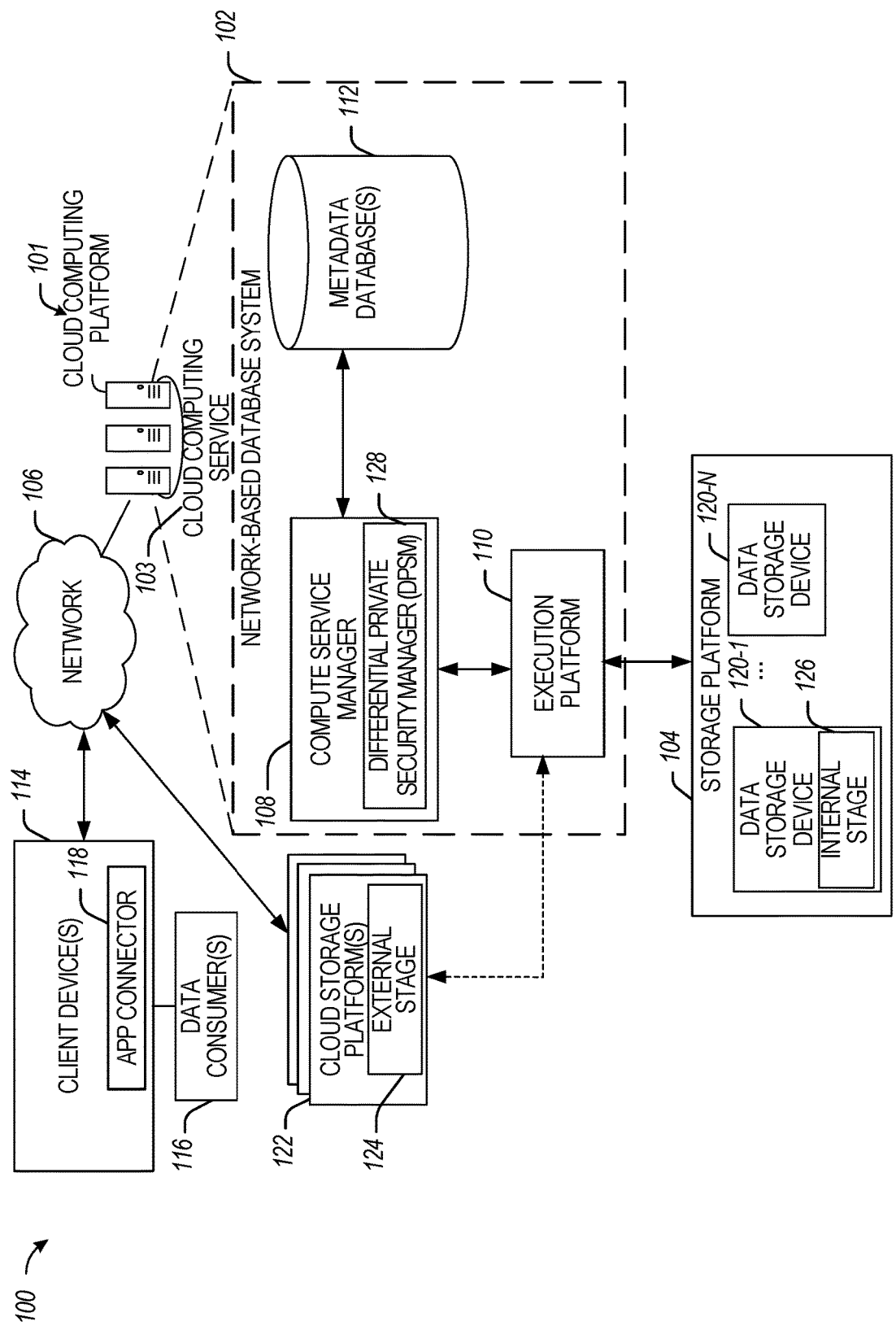
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Existing differential privacy (DP) techniques use the Laplace mechanism and Laplace gradual release. More specifically, the existing techniques add noise from a Laplace distribution and use Laplace gradual release for gradually adding noise so that the results stay Laplace. Such techniques satisfy pure DP. However, in some cases, this technique leads to less accuracy for comparable privacy, and it expands the trust base required to include the gradual release algorithm, which is non-trivial. The same existing techniques also use a fixed DP budget schedule, which leads to overspending by a factor depending on the step size.

Aspects of the present disclosure provide a DP security manager (DPSM) configured to perform the disclosed DP techniques for differential privacy adaptive count using Gaussian noise and dynamic step size. The disclosed techniques facilitate DP processing in two ways:

(a) Instead of using Laplace noise, the disclosed techniques use Gaussian noise in connection with DP processing. Using Gaussian noise can result in better accuracy without relying on Laplace gradual release for a privacy guarantee. Instead, privacy follows directly from composition theorems. Additionally, the estimator uses inverse variance weighting to average noisy Gaussian estimates, producing a new Gaussian of the appropriate scale.

(b) The disclosed DP techniques also use an adaptive step size once the result is close to correct to minimize DP budget overspending.

In some embodiments, the disclosed DP techniques use as inputs an initial noise scale and an accuracy target and generate outputs accordingly. The outputs can include a sample from a Gaussian distribution satisfying both differential privacy and the requested accuracy target while minimizing privacy cost. In some aspects, the disclosed algorithm iteratively estimates the size of a dataset with differential privacy. At each step, the disclosed techniques use the Gaussian mechanism to compute a noisy estimate and average previous estimates to update a current best guess. For example, the disclosed algorithm, which can be performed by the disclosed DPSM configured in a network-based database system, starts with significant noise and reduces the variance of added noise on a multiplicative schedule until the expected relative error of the estimate is close to 100%. The algorithm then proceeds to use the current estimate to determine the new target noise scale that would meet the accuracy target.

The various embodiments that are described herein are described with reference, where appropriate, to one or more of the various figures. An example computing environment using a DPSM is discussed in connection with FIGS. 1-3. Example configuration and functions associated with the DPSM are discussed in connection with FIGS. 4-12. A more detailed discussion of example computing devices that may be used in connection with the disclosed techniques is provided in connection with FIG. 13.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not explicitly described herein. In other embodiments, the computing environment may comprise another type of network-based database system or a cloud data platform. For example, in some aspects, the computing environment 100 may include a cloud computing platform 101 with the network-based database system 102, storage platforms 104 and 122. The cloud computing platform 101 provides computing resources and storage resources that may be acquired (purchased) or leased (e.g., by users such as data providers and data consumers) and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the attribute store configuration functions described herein). The cloud computing platform 101 may include a three-tier architecture: data storage (e.g., storage platforms 104 and 122), an execution platform 110, and a compute service manager 108 providing cloud services (e.g., functionalities of the DPSM 128 to configure and provide DP-related processing).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™(AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and external stages are stages that correspond to data storage at one or more external storage locations. In this regard, external files can be stored in external stages at one or more external storage locations. Internal files can be stored in internal stages at one or more internal storage locations, which can include servers managed and controlled by the same organization (e.g., company) that manages and controls the data platform and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the storage platforms 104 and 122 (e.g., AWS®, Microsoft Azure Blob Storage®, or Google Cloud Storage), client device 114 (e.g., a data provider), and data consumer 116 via network 106. The network-based database system 102 is a network-based system used for reporting and analysis of integrated data from one or more disparate sources, including one or more storage locations within the storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed MT-related functions) to multiple client accounts, including an account of the data provider associated with client device 114 and an account of the data consumer 116. In some embodiments, the compute service manager 108 comprises the DPSM 128, which can be used in connection with DP-related functions, including configuring or implementing a differentially private security system for executing a query in a differentially private manner. A more detailed description of the functions provided by the DPSM 128 is provided in connection with FIGS. 4-12.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts, such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider or another type of user) supported by the network-based database system 102. The data provider may utilize application connector 118 at the client device 114 to submit data storage, retrieval, and analysis requests to the compute service manager 108 as well as to access or configure other services provided by the compute service manager 108 (e.g., services associated with the disclosed MT-related functions).

Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client devices (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 116 can communicate with the client device 114 to access functions offered by the data provider. Additionally, the data consumer can access functions (e.g., attribute store-related functions, including providing features and metrics used in ML and BI-related processing) offered by the network-based database system 102 via network 106.

The compute service manager 108 is also coupled to one or more metadata databases 112 that store metadata about various functions and aspects associated with the network-based database system 102 and its users. For example, a metadata database of the one or more metadata databases 112 may include a summary of data stored in remote data storage systems as well as data available from a local cache. Additionally, a metadata database of the one or more metadata databases 112 may include information regarding how data is organized in remote data storage systems (e.g., the storage platform 104) and the local caches. Information stored by a metadata database of the one or more metadata databases 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platforms 104 and 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data storage technology. Additionally, the storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the storage platforms 122.

In some embodiments, communication links between elements of the computing environment 100 are implemented via one or more data communication networks, such as network 106. The one or more data communication networks may utilize any communication protocol and any communication medium. In some embodiments, the data communication networks are a combination of two or more data communication networks (or sub-networks) coupled with one another. In alternate embodiments, these communication links are implemented using any communication medium and any communication protocol.

The compute service manager 108, the one or more metadata databases 112, the execution platform 110, and the storage platform 104 are shown in FIG. 1 as individual discrete components. However, each of the compute service manager 108, one or more metadata databases 112, execution platform 110, and storage platforms 104 and 122 may be implemented as a distributed system (e.g., distributed across multiple systems/platforms at multiple geographic locations). Additionally, each of the compute service manager 108, one or more metadata databases 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database of the one or more metadata databases 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the storage platform 104. Thus, the computing resources and cache resources are not restricted to specific data storage devices 120-1 to 120-N. Instead, all computing resources and all cache resources may retrieve data from and store data to any of the data storage resources in the storage platform 104.

Figure 2:
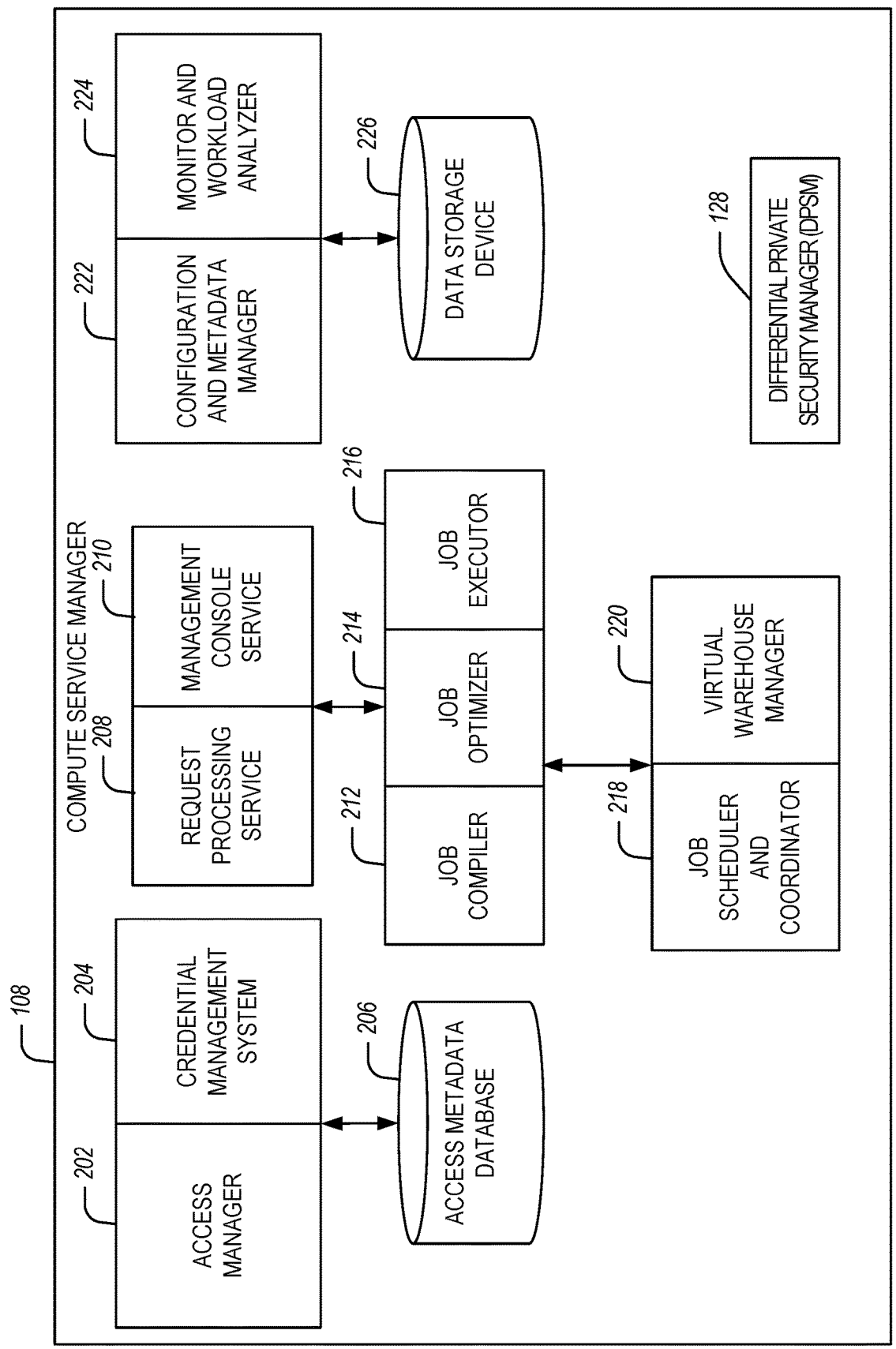
FIG. 2 is a diagram illustrating the components of a compute service manager using a differentially private security manager (DPSM), in accordance with some embodiments of the present disclosure.

FIG. 2 is a block diagram illustrating components of the compute service manager 108 using an FCM, in accordance with some embodiments of the present disclosure. As shown in FIG. 2, the compute service manager 108 includes an access manager 202 and a credential management system 204 coupled to an access metadata database 206, which is an example of the one or more metadata databases 112. Access manager 202 handles authentication and authorization tasks for the systems described herein. The credential management system 204 facilitates the use of remotely stored credentials to access external resources, such as data resources, in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs, such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in the execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1) may need to communicate with another execution node (e.g., execution node 302-2) and should be disallowed from communicating with a third execution node (e.g., execution node 312-1) and any such illicit communication can be recorded (e.g., in a log or other location). Also, the information stored on a given execution node is restricted to data relevant to the current query, and any other data is unusable, rendered so by destruction or encryption where the key is unavailable.

In some embodiments, the compute service manager 108 further includes the DPSM 128, which can be used in connection with configuring or implementing a differentially private security system for executing a query in a differentially private manner.

Figure 3:
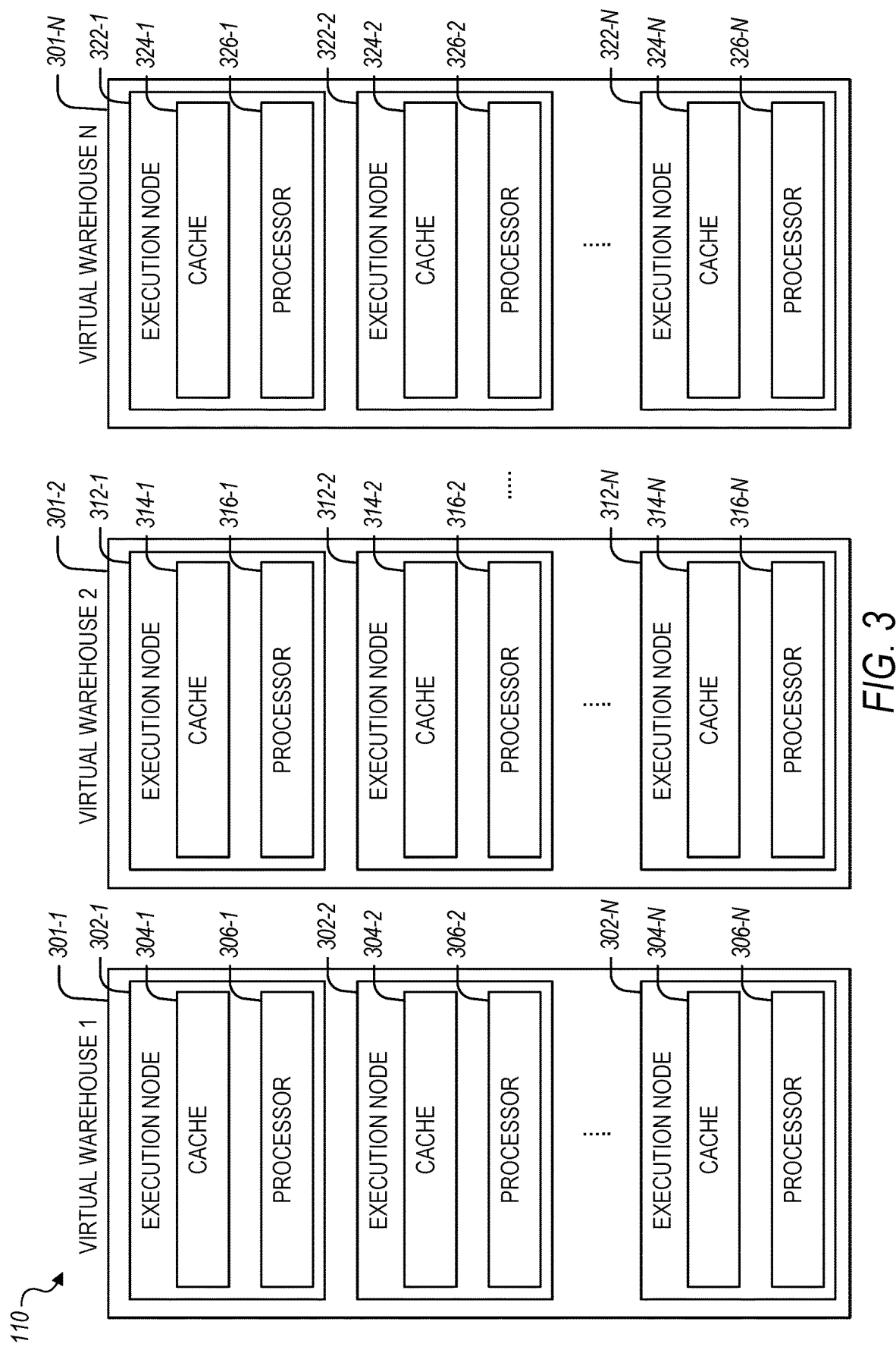
FIG. 3 is a diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, they can access data from any of the data storage devices 120-1 to 120-N within the storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes: 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes: 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes: 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while another computing system implements virtual warehouses 2 and n at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed.

Similarly, existing virtual warehouses may be deleted when the resources associated with the virtual warehouse are no longer necessary.

In some embodiments, the virtual warehouses may operate on the same data in the storage platform 104, but each virtual warehouse has its execution nodes with independent processing and caching resources. This configuration allows requests on different virtual warehouses to be processed independently and with no interference between the requests. This independent processing, combined with the ability to add and remove virtual warehouses dynamically, supports the addition of new processing capacity for new users without impacting the performance observed by the existing users.

Figure 4:
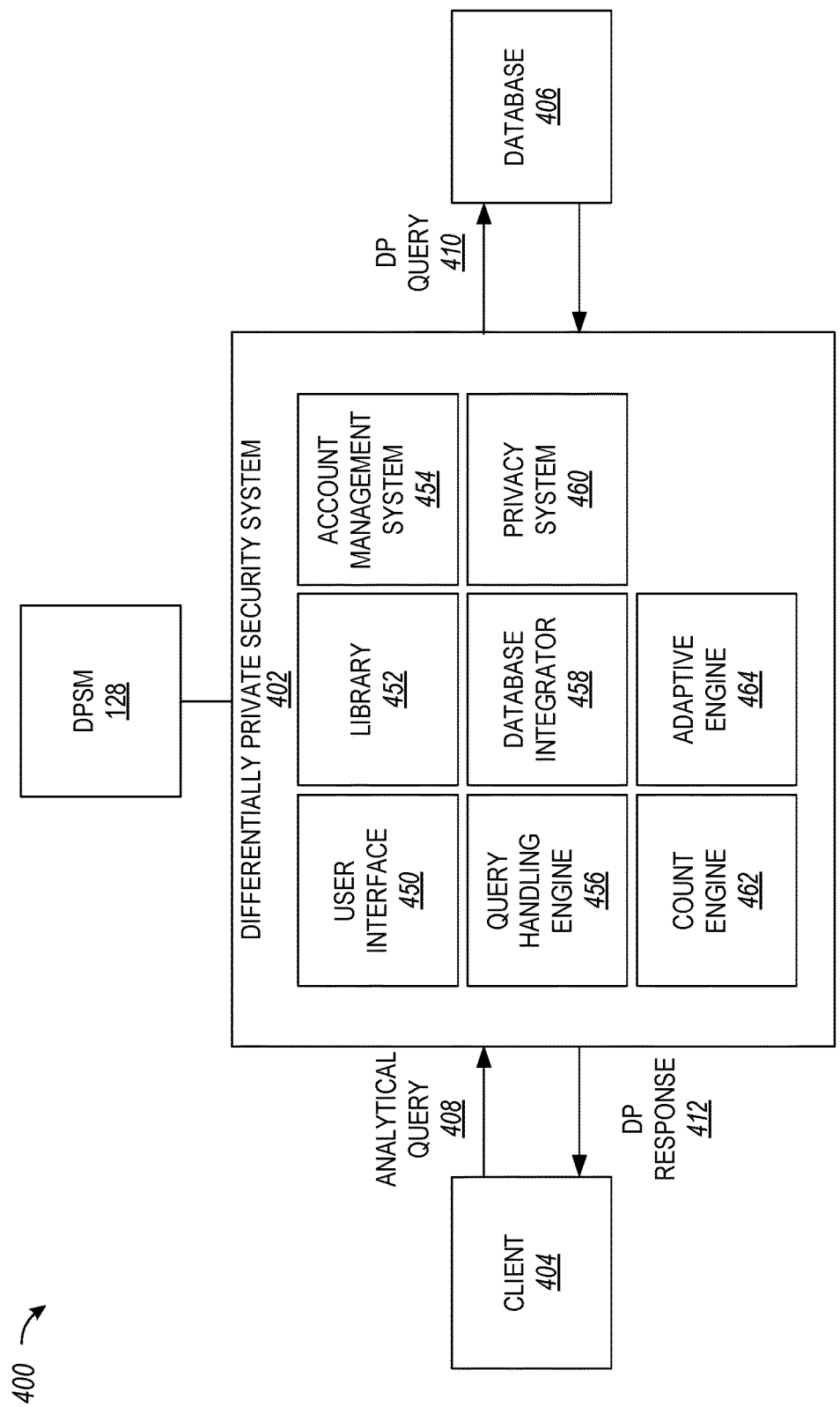
FIG. 4 is a diagram illustrating a differentially private security system that can be configured by the DPSM of FIG. 2, in accordance with some embodiments of the present disclosure.

FIG. 4 is a diagram of a differentially private security system that can be configured by the DPSM of FIG. 2, in accordance with some embodiments of the present disclosure.

FIG. 5 illustrates an example data structure (e.g., database 500) that can be processed by the differentially private security system of FIG. 4, in accordance with some embodiments.

Figure 6:
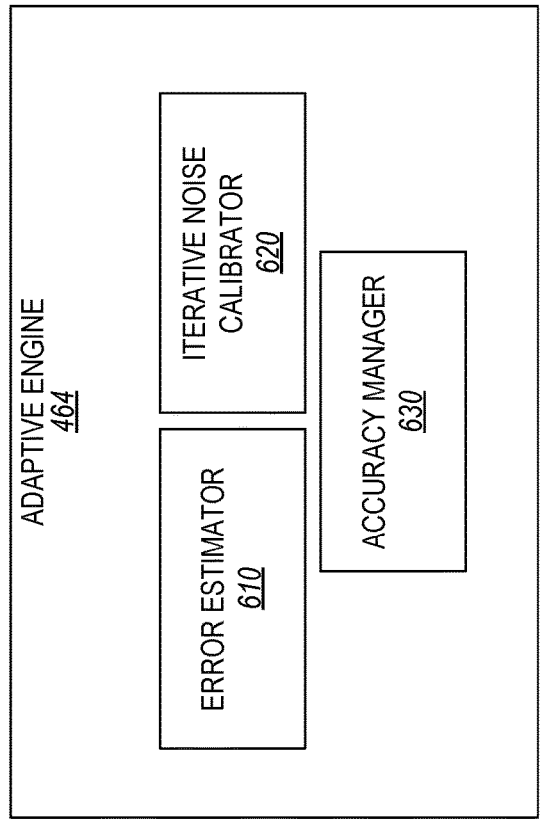
FIG. 6 is a diagram of an adaptive engine that can be used by the differentially private security system of FIG. 4, in accordance with some embodiments.

FIG. 6 is a diagram 600 illustrating an adaptive engine that can be used by the differentially private security system of FIG. 4, in accordance with some embodiments.

FIG. 4 is a diagram of a system 400 for receiving a query 408 for a database 406 and responding to query 408 by executing the query in a differentially private (DP) manner, according to one embodiment. The system 400 includes a DPSM 128, which can configure (or otherwise implement) a differentially private security system (DP system) 402 that receives an analytical query 408 from a client 404 and applies a DP version of the query (e.g., DP query 410) on the database 406. Subsequently, the DP system 402 returns the response of the DP query 410 to the client 404 as the DP response 412.

Database 406 is one or more databases managed by one or more entities. Database 406 may be managed by the same entity that manages the DP system 402 or by a different entity. Database 406 stores at least some restricted data. The restricted data may be represented as rows of records, with each record having a set of columns holding values of the record.

Restricted data is data to which access and/or usage is limited due to legal, contractual, and/or societal concerns. Examples of restricted data include health data of patients and financial records of people, businesses, or other entities. Similarly, restricted data may include census data or other forms of demographic data describing people, businesses, or other entities within geographic areas. Restricted data also includes usage data describing how people interact with electronic devices and/or network-based services. For example, restricted data may include location data describing geographic movements of mobile devices, consumption history data describing how and when people consume network-based content, and the particular content consumed (e.g., music and/or video content), and messaging data describing when and to whom users send messages via mobile or other electronic devices.

A client 404 is used to access the restricted data in database 406. A client 404 is an electronic device such as a desktop, laptop, tablet computer, or smartphone used by a human user to access the database 406. The client 404 and user may be, but are not necessarily, associated with the entities that manage the database 406 and/or DP system 402. Users of client 404 include administrators and analysts. Administrators use the client 404 to access the DP system 402 and/or database 406 to perform administrative functions such as provisioning other users and/or clients 404 and configuring, maintaining, and auditing usage of the system and/or database. The administrators may access the DP system 402 and database 406 directly via administrative interfaces that allow users with appropriate credentials and access rights to perform administrative functions.

Analysts use client 404 to apply analytical queries (e.g., analytical query 408) to the restricted data in database 406. The client 404 used by the analysts access the database 406 only through the DP system 402. Depending upon the embodiment, the analyst and/or client 404 may have an account provisioned by an administrator, which grants the analyst or client certain rights to access the restricted data in the database 406.

The rights to the restricted data may be specified in terms of a privacy budget. The privacy budget describes limits on how much of the restricted data can be released. In one embodiment, the privacy budget is a numerical value representative of a number and/or type of remaining queries (e.g., analytical query 408) available or a degree of information that can be released about data, e.g., data in a database or accessible by the DP system 402. The privacy budget may be specified in terms of a query, analyst, client 404, entity, globally, and/or time period. For example, the privacy budget may specify limits for an individual query, with each query having a separate budget. The privacy budget may also specify limits for an analyst or client, in which case the budget is calculated cumulatively across multiple queries from a client or analyst. For a privacy budget specified for an entity, such as an organization having multiple clients and users, the privacy budget is calculated cumulatively across the multiple queries from clients and users associated with the entity. A global privacy budget, in turn, is calculated across all queries to the database, regardless of the source of the query. The privacy budget may also specify an applicable time period. For example, the privacy budget may specify that queries from particular clients may not exceed a specified budget within a given time period, and the budget may reset upon expiration of the time period. Depending upon the embodiment, the client, as used herein, may alternatively or additionally refer to a user using the client to access the DP system 402, to a user account registered with the DP system 402, to a group of users, or a group of clients, and/or to another entity that is a source of queries.

As discussed above, client 404 sends an analytical query 408 to the DP system 402 and also receives a differentially private response 412 to the query from the system. The queries submitted by client 404 (e.g., analytical query 408) may be simple queries, such as count queries that request the number of entries in the databases 406 that satisfy a condition specified by the client 404, or complicated queries, such as predictive analytics queries that request a data analytics model trained on the databases 406. Specific types of queries are discussed in more detail below.

Each query has an associated set of privacy parameters. The privacy parameters indicate the amount of restricted data to release from database 406 to client 404 in response to query 408. The privacy parameters likewise indicate a privacy spend, which is the amount of decrease in the relevant privacy budget (e.g., the budget for the client 404 or the entity with which the client is associated) in response to the performance of the query 408. In one embodiment, client 404 specifies a set of associated privacy parameters with each submitted query 408. In other embodiments, the privacy parameters are specified in other ways. The DP system 402 may associate privacy parameters with received queries (rather than obtaining the parameters directly from the query). For example, the DP system 402 may apply a default set of privacy parameters to queries that do not specify the parameters. The values of the default privacy parameters may be determined based on client 404, analyst, query type, and/or other factors, such as the privacy budget of the client.

The DP system 402 receives an analytical query 408 from client 404 and returns a differentially private response 412 to the client. In one embodiment, the DP system 402 determines the privacy parameters associated with the query and evaluates the parameters against the applicable privacy budget. Alternatively, the analytical query 408 may specify the one or more privacy parameters of the set of privacy parameters. If the analytical query 408 and associated privacy parameters exceed the privacy budget, the DP system 402 may deny (i.e., not execute) the query. Alternatively, the DP system 402 may adjust the privacy parameters to fall within the privacy budget and execute the query using the adjusted privacy parameters. If the privacy parameters do not exceed the privacy budget, the DP system 402 executes a DP version of query 410 on database 406, such that it releases a degree of restricted data from database 406 indicated by the privacy parameters specified by the client 404, and also protects a degree of privacy of the restricted data specified by the privacy budget. For example, an administrator of database 406 may set a privacy budget specifying a maximum threshold on the amount of restricted data released by given query 408 that the client 404 may not exceed. Thus, the DP system 402 balances the privacy protection of the restricted data in database 406 while releasing useful information on database 406 to client 404.

The DP query 410 applied to the database 406 by the DP system 402 is a differentially private version of query 408 that satisfies a definition of differential privacy described in more detail concerning the privacy system 460. The DP system 402 may apply the DP query 410 to database 406 by transforming the analytical query 408 into one or more queries derived from the analytical query that causes database 406 to release differentially private results. The DP system 402 may then return these differentially private results to the client as the DP response 412. The DP system 402 may also, or instead, apply the DP query 410 to the database 406 by transforming the analytical query into one or more derived queries that cause the database to release results that are not necessarily differentially private. The DP system 402 may then transform the released results in a way that enforces differential privacy to produce the DP response 412 returned to client 404. These transformations may involve perturbing the process by which the DP query 410 is produced from the analytical query 408 and/or perturbing the results released by the database 406 with noise that provides the differential privacy specified by the privacy parameters while enforcing the privacy budget.

The DP system 402 allows an analyst to perform database queries on restricted data and thereby perform analyses using the DP response 412 returned by the queries while maintaining adherence to privacy parameters and a privacy budget. In addition, the techniques used by the DP system 402 allow database queries to access restricted data in ways that do not compromise the analytical utility of the data. The DP system 402 supports a wide variety of analytical and database access techniques and provides fine-grained control of the privacy parameters and privacy budget when using such techniques. The DP system 402 thus provides an improved database system, having expanded and enhanced access to restricted data relative to other database systems.

An analyst can use the DP system 402 for a variety of different purposes. In one embodiment, the restricted data in database 406 includes training data describing features of entities relevant to a particular condition. The analyst uses the DP system 402 to build one or more differentially private machine-learned models, such as classifiers, from the training data. The analyst can apply data describing a new entity to the machine-learned models and use the outputs of the models to classify the new entity as having or not having the condition. However, an adversary cannot use the information in the machined-learned models to ascertain whether individual entities described by the training set have the condition due to the differentially private nature of the models.

Such models may be retained and executed within the DP system 402. For example, an analyst can issue an analytical query 408 that causes the DP system 402 to interact with the restricted data in database 406 to build machine-learned models. The DP system 402 can then store the models within the system or an associated system. The analyst can use a new analytical query 408 or another interface to system 402 to apply the data describing the new entity to the models. The DP system 402 can execute the new data on the stored models and output the classification of the entity as a DP response 412. Alternatively, or in addition, the DP system 402 can output the trained models as a DP response 412, and an analyst can store and apply data to the models using different systems to classify the entity.

Examples of the types of classifications that may be performed using such models include determining whether a person (the entity) has a medical condition. In this example, the restricted training data includes health data describing patients who are labeled as having or not having a given medical condition. The analyst applies health data for a new patient to the one or more differentially private machine-learned models generated from the restricted training data to diagnose whether the new patient has the medical condition.

Another example classification that may be performed using such models involves identifying fraudulent or otherwise exceptional financial transactions. In this example, the restricted training data includes financial transaction data associated with one or more people or institutions, where the transactions are labeled as exceptional or not exceptional. The analyst applies financial transaction data for a new transaction to the one or more differentially private machine-learned models generated from the restricted training data to determine whether the new transaction is exceptional. The analyst can block, flag, or otherwise report an exceptional transaction.

As shown in FIG. 4, the DP system 402 includes a user interface 450, a library 452, an account management system 454, a query handling engine 456, a database integrator 458, a privacy system 460, a count engine 462, and an adaptive engine 464. Some embodiments of the DP system 402 have different or additional modules than the ones described here. Similarly, the functions can be distributed among the modules in a different manner than is described here. Specific modules and functions can be incorporated into other modules of the DP system 402.

The user interface 450 generates a graphical user interface on a dedicated hardware device of the DP system 402 or the client 404 in which the client 404 can submit an analytical query 408 and the desired privacy parameters, view the DP response 412 in the form of numerical values or images, and/or perform other interactions with the system. Client 404 may also use the graphical user interface to inspect the database 406 schemata, view an associated privacy budget, cache the DP response 412 to view the response later, and/or perform administrative functions. The user interface 450 submits properly formatted query commands to other modules of the DP system 402.

The library 452 contains software components that can be included in external programs that allow the client 404 to submit the analytical query 408, receive the DP response 412, and other functions within a script or program. For example, client 404 may use the software components of library 452 to construct custom data analytic programs. Each of the software components in library 452 submits properly formatted query commands to other modules of the DP system 402.

The account management system 454 receives properly formatted query commands (herein "query commands" or "QC"), parses the received query commands, and verifies that the commands are syntactically correct.

Examples of query commands accommodated by the DP system 402, according to one embodiment, are listed below in Table 1.

TABLE 1

QC1. Count
'SELECT COUNT (<column>) FROM <database.table>
WHERE <where_clause> BUDGET <eps> <delta>.
QC2. Median
'SELECT MEDIAN (<column>) FROM <database.table>
WHERE <where_clause> BUDGET <eps> <delta>.
QC3. Mean
'SELECT MEAN (<column>) FROM <database.table>
WHERE <where_clause> BUDGET <eps> <delta>.
QC4. Variance
'SELECT VARIANCE (<column>) FROM <database.table>
WHERE <where_clause> BUDGET <eps> <delta>.
QC5. Inter-Quartile Range
'SELECT IQR (<column>) FROM <database.table>
WHERE <where_clause> BUDGET <eps> <delta>.
QC6. Batch Gradient Descent
'SELECT <GLM> (<columns_x>,<column_y>,<params>) FROM
<database.table> WHERE <where_clause> BUDGET <eps> <delta>.
QC7. Stochastic Gradient Descent
'SELECT SGD <GLM> (<column>) FROM <database.table>
WHERE <where_clause> BUDGET <eps> <delta>.
QC8. Random Forest
'SELECT RANDOMFOREST (<columns_x>,<columns_y>) FROM
<database.table> WHERE <where_clause> BUDGET <eps> <delta>.
QC9. Histogram
'SELECT HISTOGRAM (<column>) FROM <database.table>
WHERE <where_clause_i> BUDGET <eps> <delta>.

The query handling engine 456 transforms the received query commands into appropriate function calls and database access commands by parsing the query command string. The function calls are specific to the query 408 requested by the client 404, and the access commands allow access to the required database 406. Different databases 406 require different access commands. The access commands are provided to the database integrator 458.

The database integrator 458 receives the access commands to one or more databases 406, collects the required databases, and merges them into a single data object. The data object has a structure similar to that of a database structure described in reference to FIG. 5. The data object is provided to the privacy system 460.

The privacy system 460 receives the data object from the database integrator 458, appropriate function calls from the query handling engine 456 indicating the type of query 408 submitted by the client 404, and privacy parameters specified for the query 408. The privacy system 460 evaluates the privacy parameters against the applicable privacy budget and either denies or allows the query. If the query is denied, the privacy system 460 outputs a response indicating that the query did not execute. If the query is allowed, the privacy system 460 executes the query and outputs a DP response 412 to a differentially private version of query 408 concerning the database 406. The privacy system 460 also decrements the applicable privacy budget to account for the executed query. The privacy system 460 uses differential privacy engines in the DP system 402, such as the count engine 462 and/or the adaptive engine 464, to execute the query. In an embodiment, the count engine 462 and/or adaptive engine 464 are components of the privacy system 460.

The count engine 462 generates a differentially private result in response to a query to count a set of data in the database 406, as described in greater detail below.

The adaptive engine 464 executes a query such that the DP system 402 pursues a target accuracy for the results of the query. Target accuracy is specified in terms of a relative error. The target accuracy for a query is met if the differentially private result of the query has a relative error less than or equal to the target accuracy.

Relative error is the discrepancy between an exact value and an approximation of the exact value in terms of a percentage. Specifically, the relative error is:

$$\rho = \left|\frac{v_E - v_A}{v_E}\right| * 100\%,$$

where $\rho$ is the relative error, $V_E$ is the exact value, and $V_A$ is the approximation. For example, assume a database stores information about patients in a hospital. A count query executed on the database requests a count of all patients in the hospital named Charles. The actual number of patients named Charles may be 100, but the DP system 402 provides a differentially private result with a value of 90. Here, $V_E=100$ and $V_A=90$. As such, the relative error p is 10%. This indicates that the differentially private result, 90, is 10% off from the exact value, 100.

A query executed by the adaptive engine 464 is an adaptive query that specifies a maximum privacy spend in terms of one or more privacy parameters, such as $\varepsilon$ as described below, and a target accuracy in terms of a relative error percentage. For example, an adaptive query may specify a maximum privacy spend of $\varepsilon=1$ and a target accuracy of 10%. The adaptive query also specifies one or more operations to perform on data and one or more relations indicating the data on which the adaptive engine 464 is to perform the one or more operations.

In some aspects, the maximum privacy spend used in connection with Gaussian-based DP processing can be based on (e.g., can include) a value of a zero-concentrated privacy parameter $\rho$ associated with a degree of information released about the set of data.

The adaptive engine 464 performs the operations and iteratively adjusts the noise added to the results, then checks whether the adjusted results of the operations satisfy the target accuracy. Each iteration uses a fraction of the maximum privacy spend. If the results of the operations at a given iteration do not satisfy the target accuracy, the adaptive engine 464 performs another iteration using a more significant portion of the maximum privacy spend. The adaptive engine 464 ceases iterating when either the maximum privacy spend is spent, or the target accuracy is achieved. For example, after the first iteration, $\frac{1}{100}$ of the maximum privacy spend has been used, and the results have a relative error of 20%, greater than a target accuracy of 10% relative error. As such, the adaptive engine 464 performs an additional iteration, spending $\frac{1}{50}$ of the maximum privacy spend. If the results of this second iteration have a relative error of 9%, the adaptive engine 464 ceases to iterate and provides the results of the second iteration to client 404, as their relative error is within the target accuracy of 10%.

Using the techniques described herein, the DP system 402 can provide differentially private results that satisfy a target accuracy while minimizing the privacy spend. As such, the DP system 402 can avoid providing results that lack analytical utility due to a high amount of noise injected into the results. Simultaneously, the DP system 402 can avoid overspending on privacy parameters to produce results for a query.

FIG. 5 illustrates an example database structure, according to one embodiment. The database 500 includes a data table, which may be referred to as a matrix, with several rows and columns. Each row is an entry of the database, and each column is a feature of the database. Thus, each row contains a data entry characterized by a series of feature values for the data entry. For example, as shown in FIG. 5, database 500 contains a data table with 8 entries and 11 features and illustrates a list of patient profiles. Each patient is characterized by a series of feature values that contain information on the patient's height (Feature 1), country of residence (Feature 2), age (Feature 10), and whether the patient has contracted a disease (Feature 11). A row is also referred to as a "record" in the database 406. Database 406 may include more than one data table. Henceforth, a data table may be referred to as a "table."

The feature values in the database 500 may be numerical, e.g., Features 1 and 10, or categorical, e.g., Features 2 and 11. In the case of categorical feature values, each category may be denoted as an integer. For example, in Feature 11 of FIG. 5, "0" indicates that the patient has not contracted a disease, and "1" indicates that the patient has contracted a disease.

Definition of Differential Privacy

For a given query 408, the privacy system 460 receives a data object X, function calls indicating the type of query 408, privacy parameters specified by the client 404, and outputs a DP response 412 to a differentially private version of query 408 with respect to X. Each data object X is a collection of row vectors $x_{i=1, 2, \ldots, n}$, in which each row vector $x_i$ has a series of p elements $x_i^{j=1, 2, \ldots, p}$.

A query M satisfies the definition of $\varepsilon$-differential privacy if for all:

$$\forall X, x' \in D, \forall S \subseteq \text{Range } (M): \frac{Pr[M(X) \in S]}{Pr[M(X') \in S]} \leq e^{\varepsilon},$$

where D is the space of all possible data objects, S is an output space of query M, and neighboring databases are defined as two data objects X, X' where one of X, X' has all the same entries as the other, plus one additional entry. That is, given two neighboring data objects X, X' in which one has an individual's data entry (the additional entry) and the other does not, there is no output of query M that an adversary can use to distinguish between X, X'. That is, an output of such a differentially private query M reveals little to no information about individual records in the data object X. The privacy parameter $\varepsilon$ controls the amount of information that the query M reveals about any individual data entry in X and represents the degree of information released about the entries in X. For example, in the definition given above, a small value of $\varepsilon$ indicates that the probability output of query M will disclose information on a specific data entry is small, while a large value of $\varepsilon$ indicates the opposite.

As another definition of differential privacy, a query M is $(\varepsilon, \delta)$-differentially private if for neighboring data objects X, X':

$$\forall X, x' \in D, \forall S \subseteq \text{Range } (M): \frac{Pr[M(X) \in S]}{Pr[M(X') \in S]} \leq e^{\varepsilon} + \delta,$$

The privacy parameter $\delta$ measures the improbability of the output of query M satisfying $\varepsilon$-differential privacy. As discussed in reference to FIG. 4, client 404 may specify the desired values for the privacy parameters $(\varepsilon, \delta)$ for query 408.

There are three important definitions for discussing the privacy system 460: global sensitivity, local sensitivity, and smooth sensitivity. The global sensitivity of a query M is defined as $$GS_M(X) = \max_{X, X' > d(X, X') = 1} \|M(X) - M(X')\|,$$

where X, X' are any neighboring objects, such that d (X, X')=1. This states that the global sensitivity is the most the output of query M could change by computing M on X and X'.

The local sensitivity of a query M on the data object X is given by:

$$LS_M(X) = \max_{X' > d(X, X') = 1} \|M(X) - M(X')\|,$$

where the set $\{X':d(X, X')=1\}$ denotes all data objects that have at most one entry that is different from X. That is, the local sensitivity LSM(X) is the sensitivity of the output of the query M on data objects X' that have at most one different entry from X, measured by a norm function.

Related to the local sensitivity LSM(X), the smooth sensitivity given a parameter $\beta$ is given by:

$$S_M(X; \beta) = \max_{X' \in D} \|LS_M(X) \cdot e^{-\beta d(t, X, X')}\|,$$

where d (X, X') denotes the number of entries that differ between X and X'.

Notation for Random Variables

The notation in this section is used for the remainder of the application to denote the following random variables.

(a) $G(\sigma 2)$ denotes a zero-centered Gaussian random variable with the following probability density function:

$$f(x \mid \sigma^2) = \frac{1}{\sigma\sqrt{2\pi}} e^{\frac{x^2}{2\sigma^2}}.$$

(b) L(b) denotes a zero-centered Gaussian random variable from a Gaussian distribution with the following probability density function:

$$f(x \mid b) = \frac{1}{2b} e^{-\frac{|x|}{b}}.$$

(c) C(γ) denotes a zero-centered Cauchy random variable with the following probability density function:

$$f(x \mid y) = \frac{1}{\pi y \left(1 + \left(\frac{x}{y}\right)^2\right)}.$$

Further, a vector populated with random variables R as its elements is denoted by v(R). A matrix populated with random variables R as its elements is denoted by M(R).

Count Engine

Turning back to FIG. 4, the count engine 462 produces a DP response 412 responsive to the differentially private security system 402 receiving a query 408 for counting the number of entries in a column of the data object X that satisfy a condition specified by the client 404, given privacy parameters ε and/or δ. An example query command for accessing the count engine 462 is given in QC1 above. For the example data object X shown in FIG. 5, client 404 may submit a query 408 requesting a DP response 412 indicating the number of patients that are above the age of 30.

The count engine 462 retrieves the count q from X. If privacy parameter δ is equal to zero or is not used, the count engine 462 returns $$y \approx q + L\left(c_1 \cdot \frac{1}{\epsilon}\right),$$

as the DP response 412 for display by the user interface 150, where c1 is a constant. An example value for c1 may be 1. If the privacy parameter δ is non-zero, the count engine 462 returns $$y \approx q + G\left(c_1 \cdot 2 \cdot \log\frac{1}{\delta}, \frac{1}{\epsilon^2}\right),$$

as the DP response 412 for display on the user interface 450, where c1 is a constant. An example value for c1 may be 1.

Adaptive Engine

FIG. 6 illustrates the adaptive engine 464, according to one embodiment. The adaptive engine 464 includes an error estimator 610, an iterative noise calibrator 620, and an accuracy manager 630. The adaptive engine 464 receives an adaptive query specifying a target accuracy in terms of a relative error value and a maximum privacy spend in terms of an ε value or a ρ value (which can also be referred to as the zero-concentrated DP privacy parameter that is different from the pure DP privacy parameter).

The adaptive query also specifies a count operation to be performed on a set of data. Although described herein with reference to a count operation, the adaptive engine 464 can be used with alternative operations in alternative embodiments. Upon producing a differentially private result, the adaptive engine 464 sends the differentially private result to client 404. The adaptive engine 464 may also send a notification identifying the relative error of the differentially private result.

The error estimator 610 approximates the relative error of a differentially private result. Depending upon the embodiment, the error estimator 610 can be a plug-in estimator or a Bayesian estimator. The error estimator 610 generates a temporary result by applying the noise used to produce the differentially private result into the differentially private result. The error estimator 610 then determines a relative error between the differentially private result and the temporary result. The adaptive engine 464 uses this relative error to approximate the relative error of the differentially private result as compared to the original result. In some embodiments, the adaptive engine 464 is configured to determine whether the accuracy targets have been met using the accuracy manager 630.

The iterative noise calibrator 620 iteratively calibrates the noise of a differentially private result until the differentially private result has a relative error no greater than the target accuracy, the maximum privacy spend has been used, or both. Initially, the iterative noise calibrator 620 receives an initial differentially private result from a differentially private operation, such as a differentially private count performed by the count engine 462. The received initial differentially private result is broken down into its original result, and the noise value is injected into the original result to provide differential privacy. The iterative noise calibrator 620 also receives an indicator of a fraction of the maximum privacy spend, which was used to generate the initial differentially private result. For example, the fraction of the maximum privacy spend, the "fractional privacy spend," may be 1/100 the maximum privacy spend S, i.e., S/100.

For a given iteration, the iterative noise calibrator 620 generates a corresponding fractional privacy spend such that it is larger than any fractional privacy spends of preceding iterations. For example, if the iterative noise calibrator 620 receives an indication that the fractional privacy spend to produce the initial differentially private result was S/100, the fractional privacy spend for a first iteration may be S/50, a fractional privacy spend for a second iteration may be S/25, and so on. The fractional privacy spend of an iteration increments by a specified amount from one iteration to the next. The increment can be based on the amount of the fractional privacy spend of an immediately preceding iteration. For example, the amount by which the fractional privacy spend of one iteration increases from a previous fractional privacy spend can be a doubling of the previous fractional privacy spend.

In an embodiment, the amount by which the fractional privacy spend of one iteration increases from a previous fractional privacy spend varies proportionally to the difference between the target accuracy and a relative error of a differentially private result of a preceding iteration. The function by which the fractional privacy spend increases in proportion to the difference between the target accuracy and a relative error depends upon the embodiment. As an example of the variance, a first iteration produces a differentially private result with a relative error of 20%, where the target accuracy is 10%. As such, the fractional privacy spend may double. However, if after the first iteration, the differentially private result has a relative error of 12%, then the second iteration may generate a fractional privacy spend that is only 20% larger than the fractional privacy spend used in the first iteration. In this second embodiment, the amount by which the fractional privacy spend can increase from one iteration to the next may be capped. For example, the fractional privacy spend may be capped to never more than double a preceding fractional privacy spend, e.g., S/50 will never be immediately followed by a larger fractional privacy spend than S/25, regardless of what the function outputs as the increment from the one fractional privacy spend to another.

For the given iteration, the iterative noise calibrator 620 generates a new noise value by sampling from a Gaussian distribution. The iterative noise calibrator 620 then incorporates the new noise value using inverse variance weighted averaging. In some aspects, the iterative noise calibrator 620 incorporates the new noise value into the differentially private result by injecting the new noise value into the original result from the operation specified in the query and updating the differentially private result to the resultant value.

After incorporating the new noise into the differentially private result, the iterative noise calibrator 620 checks whether the differentially private result satisfies the target accuracy using the error estimator 610. If the differentially private result satisfies the target accuracy by being no greater than the target accuracy, the iterative noise calibrator 620 ceases to iterate and sends the differentially private result to client 404. If the differentially private result does not satisfy the target accuracy, the iterative noise calibrator 620 proceeds to another iteration.

If an iteration cannot increase the fractional privacy spend, i.e., the fractional privacy spend equals the maximum privacy spend, the iterative noise calibrator 620 stops iterating. If so, the adaptive engine 464 may send the differentially private result to client 404 with a notification that the target accuracy could not be reached. The notification may indicate the achieved accuracy, i.e., the relative error.

In some embodiments, the DP security system 402 (e.g., the privacy system 460 and adaptive engine 464) can use a Gaussian random variable and Gaussian noise instead of adding noise from a Laplace distribution. Additionally, the error estimator 610 of the adaptive engine 464 can be configured to use inverse variance weighting to average noisy Gaussian estimates, producing a new Gaussian of the appropriate scale. In some embodiments, the error estimator 610 uses inverse variance weighting to obtain a Gaussian of the appropriate scale.

In some embodiments, the adaptive engine 464 uses an adaptive step size instead of a geometric budget schedule. The use of an adaptive step size, once the result is close to correct, minimizes DP budget overspending.

Figure 7:
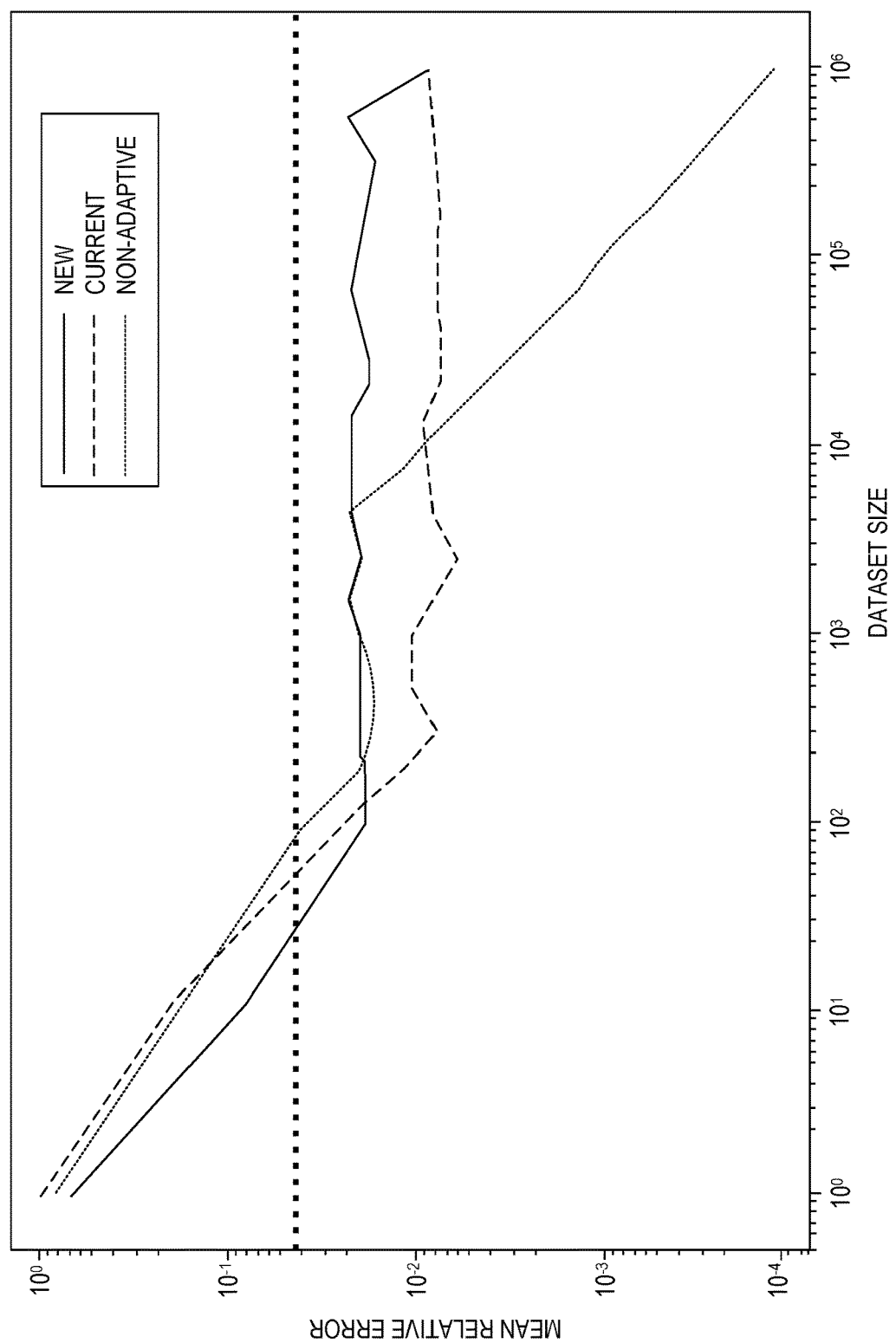
FIG. 7 is a graph of mean relative error in relation to dataset size associated with the differentially private security system of FIG. 4 using different step size configurations, in accordance with some embodiments.
Figure 8:
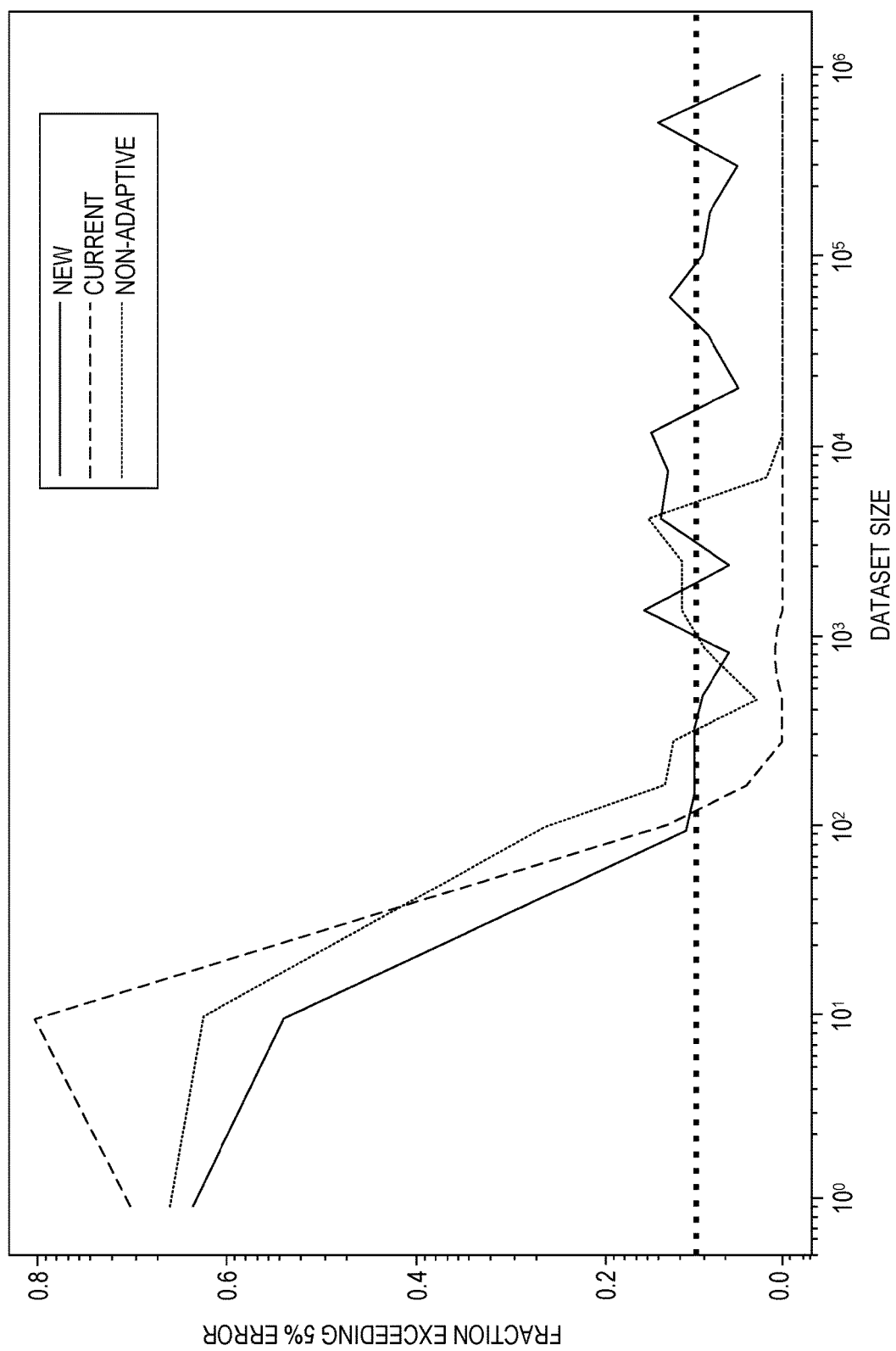
FIG. 8 is a graph of fractions exceeding 5% error in relation to dataset size associated with the differentially private security system of FIG. 4 using different step size configurations, in accordance with some embodiments.
Figure 9:
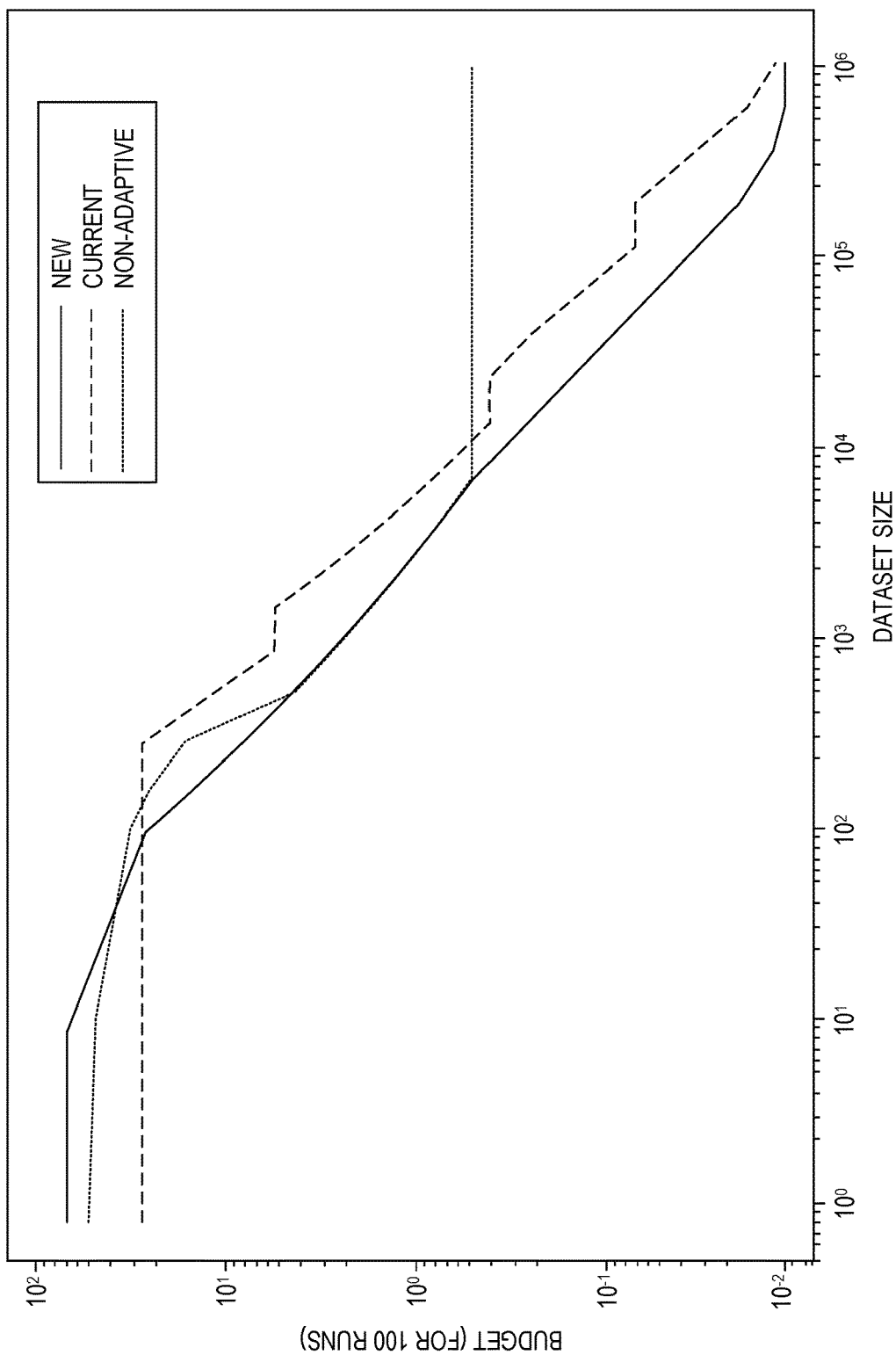
FIG. 9 is a graph of budget (or privacy leakage) in relation to dataset size associated with the differentially private security system of FIG. 4 using different step size configurations, in accordance with some embodiments.

The performance of the DP security system under different configurations based on the step size is illustrated by the graphs in FIGS. 7-9. In FIGS. 7-9, the accuracy target is designated by a bolded dashed line.

FIG. 7 is graph 700 of mean relative error in relation to dataset size associated with the differentially private security system of FIG. 4 using different step size configurations, in accordance with some embodiments.

FIG. 8 is graph 800 of fractions exceeding 5% error in relation to dataset size associated with the differentially private security system of FIG. 4 using different step size configurations, in accordance with some embodiments.

FIG. 9 is a graph 900 of budget (or privacy leakage) in relation to dataset size associated with the differentially private security system of FIG. 4 using different step size configurations, in accordance with some embodiments.

In FIGS. 7-9, graph line "new" refers to a configuration of the DP security system 402 using Gaussian noise and adaptive step size, graph line "current" refers to a configuration of the DP security system 402 using Laplace noise and fixed geometric step size, and graph line "non-adaptive" refers to a configuration of the DP security system 402 using a fixed budget for privacy leakage.

As illustrated in FIG. 7, the "non-adaptive" configuration is associated with low error for large data sets and high error for small data sets. Additionally, the "current" configuration is associated with lower error than the "new" configuration but at the cost of a higher budget spent (e.g., higher privacy leakage), which is also seen in FIG. 9. FIG. 9 further illustrates that the "new" configuration is associated with a more consistent budget as a function of data size in comparison to the other configurations.

In some embodiments, the error estimator 610 of the adaptive engine 464 is configured to stop the operation of the adaptive engine when the current estimate has sufficient accuracy. In some aspects, the accuracy requirement can be supplied as input, and it is met in the output (e.g., the DP response 412). For example, the input can include a scale of noise and a noisy count associated with the estimation output.

Figure 10:
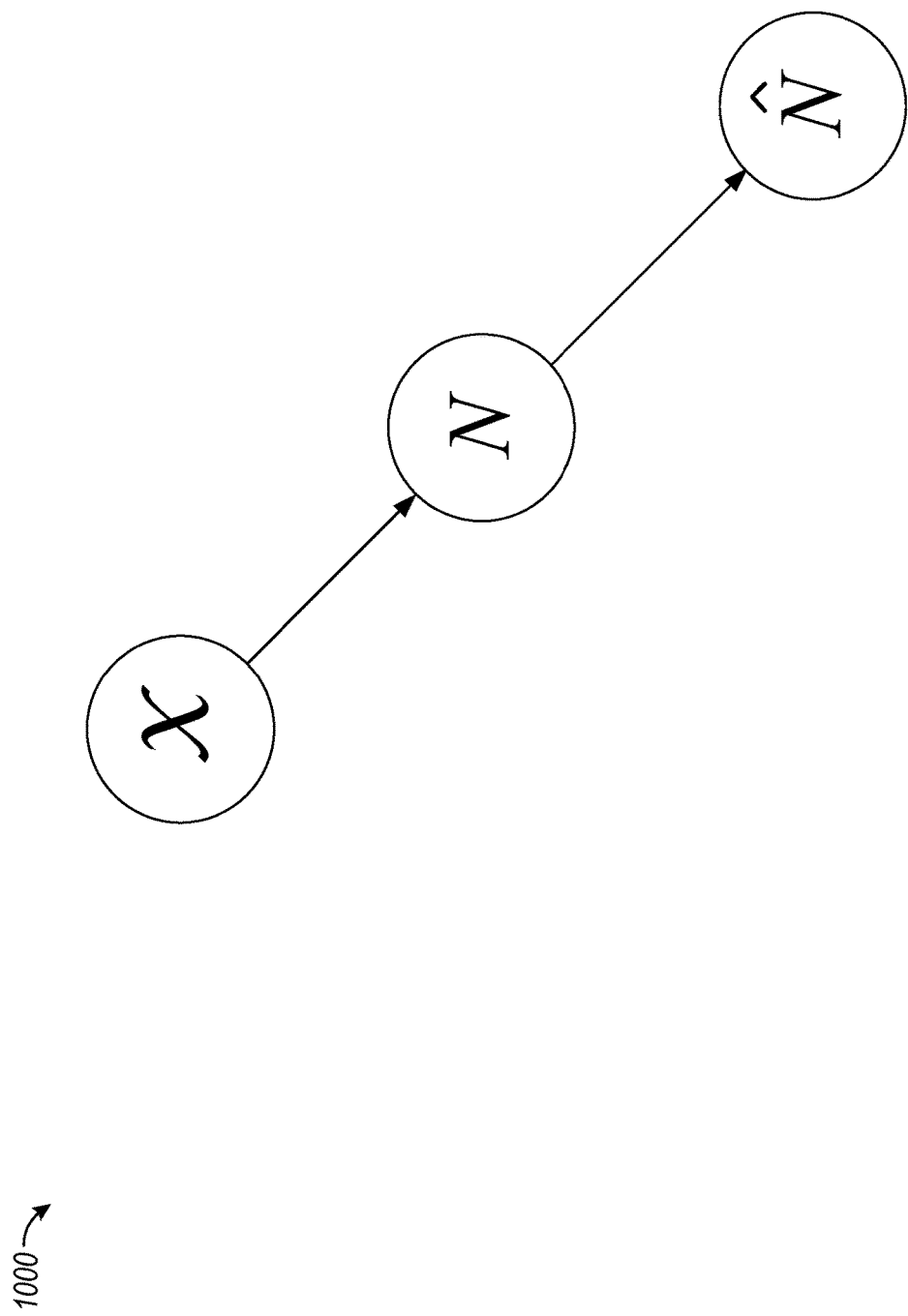
FIG. 10 and FIG. 11 illustrate Bayes networks showing the relationship between variables, which can be used in connection with a Bayesian estimator in the differentially private security system of FIG. 4, in accordance with some embodiments.
Figure 11:
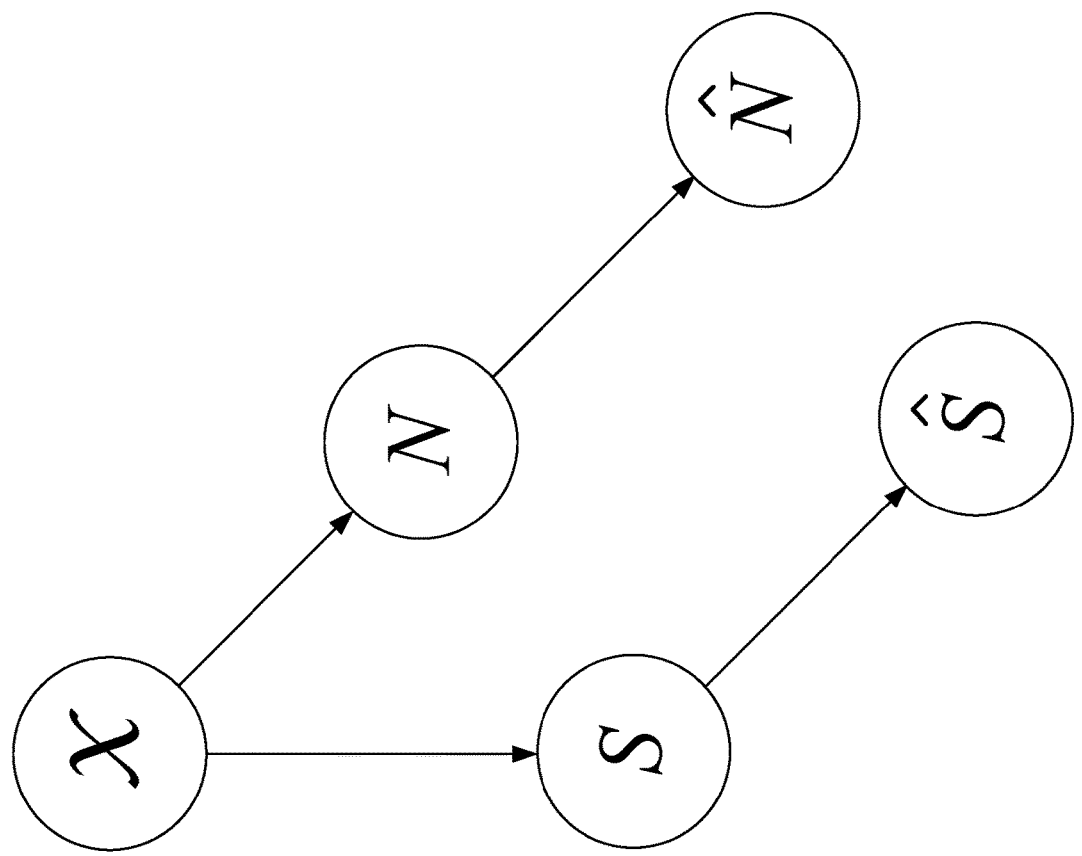

The error estimator 610 can be configured to use different statistical techniques to determine whether the result meets the accuracy requirements. For example, the error estimator 610 can be configured as a plug-in estimator or a Bayesian estimator. FIG. 10 and FIG. 11 illustrate corresponding diagrams 1000 and 1100 of Bayes networks showing the relationship between variables, which can be used in connection with a Bayesian estimator in the differentially private security system of FIG. 4, in accordance with some embodiments.

Example configurations that can be used in a Bayesian estimator (e.g., for Gaussian noise) are disclosed herein below in connection with sections (A), (B), and (C).

(A) Count with Gaussian Mechanism.

A data set can be defined as a configuration of values between a lower and upper bound, $x_{inf}$ and $x_{sup}$, respectively:

$$\chi = \{(i, x_i) \mid \forall i, i \in [1, N] \land x_{inf} \leq x_i \leq x_{sup}\} \quad (1)$$

When a noisy count $\hat{N}$ of a data set using the Gaussian mechanism is generated, the likelihood that the actual count of the data set N is some value Ninf δ N δ Nsup can also be computed.

FIG. 10 illustrates the causal relationship between values, giving a joint probability of:

$$P(\hat{N}, N, X) = P(\hat{N} \mid N) P(N \mid X) P(X) \quad (2)$$

The probability that N results in N can be obtained from the joint probability as follows:

$$P(N \mid \hat{N}) = \frac{P(\hat{N} \mid N) P(N)}{P(\hat{N})} \text{ Bayes' rule} \quad (3)$$

$$= \frac{P(\hat{N} \mid N) P(N)}{\Sigma_j P(\hat{N} \mid N_j)(N_j)} \text{ Law of Total Probability} \quad (4)$$

$$= \frac{P(\hat{N} \mid N) P(N)}{z(\hat{N})} \quad (5)$$

$$P(N) = \sum_i P(N \mid \chi_i) P(\chi_i) \text{ Law of Total Probability} \quad (6)$$

-continued $$\mathcal{Z}(\hat{N}) = \sum_j P(\hat{N} \mid N_j) P(N_j) \qquad (7)$$

where $Z(\hat{N})$ is the partition function. The configuration may not provide additional information beyond the count, but it can be used for additional processing, as discussed below.

Using the principle of indifference, $P(N)$ is a constant. $\hat{N}$ can be generated using the Gaussian mechanism with probability distribution as follows:

$$P_\lambda(x \mid \mu) = \frac{1}{2\lambda} \begin{cases} e^{-\frac{\mu-x}{\lambda}} & x < \mu \\ e^{-\frac{x-\mu}{\lambda}} & x \geq \mu \end{cases} \qquad (8)$$

so that $$\mathcal{Z}(\hat{N}) = \frac{1}{2\lambda} \sum_{z=a}^{b} \begin{cases} e^{-\frac{z-\hat{N}}{\lambda}} & \hat{N} < z \\ e^{-\frac{\hat{N}-z}{\lambda}} & \hat{N} \geq z \end{cases} \qquad (9)$$

(A.1) Main result for Count.

Simplified, the partition function is as follows:

$$\ln \mathcal{Z}(\hat{N}) = -\ln 2\lambda - \log 1 p\left(-e^{-\frac{1}{\lambda}}\right) + \qquad (10)$$

$$\begin{cases} -\frac{a-\hat{N}}{\lambda} + \log 1 p\left(-e^{-\frac{b-a+1}{\lambda}}\right) & \hat{N} < a \\ -\frac{\xi}{\lambda} + \log 1 p\left(e^{-\frac{1-2\xi}{\lambda}} - e^{-\frac{b-\lfloor\hat{N}+1/2\rfloor+1-2\xi}{\lambda}} - e^{-\frac{\lfloor\hat{N}+1/2\rfloor-a+1}{\lambda}}\right) & a \leq \hat{N} < b \\ -\frac{\hat{N}-b}{\lambda} + \log 1 p\left(-e^{-\frac{b-a+1}{\lambda}}\right) & \hat{N} \geq b \end{cases}$$

$$\xi = \hat{N} - \lfloor \hat{N} + 1/2 \rfloor \qquad (11)$$

An example derivation is provided in section (C).

(A.2) Special Cases.

(A.2.1) All positive integers.

Without knowing any information about the data set size, the bounds are a=0 and b=☐. So $$\ln \mathcal{Z}_0^\infty(\hat{N}, \lambda) = -\ln 2\lambda - \log 1 p\left(-e^{-\frac{1}{\lambda}}\right) + \qquad (12)$$

$$\begin{cases} \frac{\hat{N}}{\lambda} & \hat{N} < 0 \\ -\frac{\xi}{\lambda} + \log 1 p\left(e^{-\frac{1-2\xi}{\lambda}} - e^{-\frac{\lfloor\hat{N}+1/2\rfloor+1}{\lambda}}\right) & \hat{N} \geq 0 \\ N/A & \hat{N} \geq \infty \end{cases}$$

(A.2.2) One allowed value (a=b).

With a=b, the probability reduces to the degenerate distribution with N=a, as follows:

$$\mathcal{Z}_a^a(\hat{N}, \lambda) = \frac{1}{2\lambda} \begin{cases} e^{-\frac{a-\hat{N}}{\lambda}} & \hat{N} < a \\ N/A & a \leq \hat{N} < a \\ e^{-\frac{\hat{N}-a}{\lambda}} & \hat{N} \geq a \end{cases} \qquad (13)$$

$$P(N = a \mid \hat{N}) = \frac{P(\hat{N} \mid a)}{\mathcal{Z}_a^a} = 100\% \qquad (14)$$

(A.2.3) All integers.

Allowing for negative values may not be helpful for counts but may be useful for discrete choices on the whole number line, as follows:

$$\mathcal{Z}_{-\infty}^\infty = \frac{1}{2\lambda} \frac{1}{1-e^{-\frac{1}{\lambda}}} \begin{cases} N/A & \hat{N} < -\infty \\ e^{-\frac{\xi}{\lambda}}\left(1 + e^{-\frac{1-2\xi}{\lambda}}\right) & -\infty \leq \hat{N} < \infty \\ N/A & \hat{N} \geq \infty \end{cases} \qquad (15)$$

$$= \frac{1}{2\lambda} \frac{e^{-\frac{\xi}{\lambda}} + e^{-\frac{1-\xi}{\lambda}}}{1 - e^{-\frac{1}{\lambda}}} \qquad (16)$$

(B) Mean with noisy Sum and Count.

The disclosed mean algorithm can be used to compute a noisy sum and count each using a Gaussian mechanism. Upon receiving the noisy sum $\hat{S}$ and count $\hat{N}$, the probability that these values were generated from true sum S and true count N can be obtained using the derivation in section (A). In sum, the processing can include partitioning space and then using the same analysis for the count. However, the sum and count can be correlated. To demonstrate this, define a configuration of N bounded points on the real line as follows:

$$S_N = \Sigma \chi_N = \sum_{i=1}^{N} x_i \qquad (17)$$

The value of $S_N$ depends on the number of records, as follows:

$$S_0 = 0 \qquad (18)$$

$$a \leq S_1 \leq b \qquad (19)$$

$$2a \leq S_2 \leq 2b \qquad (20)$$

$$\ldots$$

$$Na \leq S_N \leq Nb \qquad (21)$$

so processing can be configured to account for this correlation.

The probability of interest is as follows:

$$P(S \cap N \mid \hat{S} \cap \hat{N}) \qquad (22)$$

From FIG. 11, the joint probabilities are as follows:

$$P(S \cap N \cap \chi) = P(S \mid \chi) P(N \mid \chi) P(\chi) \qquad (23)$$

$$P(\hat{S} \cap \hat{N} \cap S \cap N \cap \chi) = P(\hat{N} \mid N) P(\hat{S} \mid S) P(N \mid \chi) P(S \mid \chi) P(\chi) \qquad (24)$$

-continued $$= P(\hat{N} \mid N)P(\hat{S} \mid S)P(S \cap N \cap \chi) \quad (25)$$

thus $$P(S \cap N \mid \hat{S} \cap \hat{N}) = \frac{P(S \cap N \cap \hat{S} \cap \hat{N})}{P(\hat{S} \cap \hat{N})} \text{ Chain rule} \quad (26)$$

$$= \frac{\Sigma_i P(\hat{S} \cap S \cap N \cap \hat{N} \cap \chi_i)}{\Sigma_{jkl} P(\hat{S} \cap S_j \cap N_k \cap \hat{N} \cap \chi_l)} \text{ Law of Total probability} \quad (27)$$

$$= \frac{P(\hat{N} \mid N)P(\hat{S} \mid S)\Sigma_i P(S \cap N \cap \chi_i)}{\Sigma_{jk} P(\hat{N} \mid N_k)P(\hat{S} \mid S_j)\Sigma_l P(S_j \cap N_k \cap \chi_l)} \text{ Eq. 25} \quad (28)$$

$$= \frac{P(\hat{N} \mid N)P(\hat{S} \mid S)P(S \cap N)}{\Sigma_{jk} P(N \mid N_k)P(\hat{S}S_j)P(S_j \cap N_k)} \text{ Law of total probability} \quad (29)$$

$$= \frac{P(\hat{N} \mid N)P(\hat{S} \mid S)P(S \mid N)}{\Sigma_{jk} P(\hat{N} \mid N_k)P(\hat{S} \mid S_j)P(S_j \mid N_k)} P(N) = c \quad (30)$$

In some aspects, to compute the probability of the mean, all probabilities with the same mean can be added as follows:

$$P(M \mid \hat{S} \cap \hat{N}) = \int dS \sum_N P(S \cap N \mid \hat{S} \cap \hat{N}) \delta\left(\frac{S}{N} - M\right) \quad (31)$$

$$= \sum_N P((MN) \cap N \mid \hat{S} \cap \hat{N}) \quad (32)$$

The ansatz taken here is to assume $x_i$ is drawn from a uniform distribution on [a; b], then compute the number of ways N such terms can add up to S. If [a; b]= [0; 1], then the distribution of the sum is the Irwin-Hall distribution, as follows:

$$f_X(x; N) = \frac{1}{2(N-1)!} \sum_{k=0}^{N} (-1)^k \binom{N}{k} (x-k)^{N-1} \text{sgn}(x-k) \quad (33)$$

$$x = \frac{S - Na}{b - a} \quad (34)$$

The integration can be performed over the possible sums in the partition function as follows:

$$I_k(\hat{x}) = \int_0^N dx (x-k)^N \text{sgn}(x-k) \begin{cases} e^{-\frac{x-\hat{x}}{\lambda_x}} & \hat{x} < x \\ e^{-\frac{\hat{x}-x}{\lambda_x}} & \hat{x} \geq x \end{cases} \quad (35)$$

(C) A Derivation of Gaussian Count partition function.
This section uses $Z_\alpha^b(\hat{N})=Z$. More specifically:

$$\mathcal{Z}_a^b(\hat{N}) = \frac{1}{2\lambda} \sum_{z=a}^{b} \begin{cases} e^{-\frac{z-\hat{N}}{\lambda}} & \hat{N} < z \\ e^{-\frac{\hat{N}-z}{\lambda}} & \hat{N} \geq z \end{cases} \quad (36)$$

In some aspects, the following three cases can be considered in the sum:
1. $\tilde{N} < a$;
2. $a \leq \tilde{N} < b$; and
3. $b \leq \tilde{N}$.

For case 1, all $z \geq a$, so they are all greater than $\hat{N}$, thus:

$$\mathcal{Z}_1 = \frac{1}{2\lambda} \sum_{z=a}^{b} e^{-\frac{z-\hat{N}}{\lambda}} \quad (37)$$

Likewise, for case 3, all $z \leq b$, so they are all less than or equal to $\tilde{N}$, thus:

$$\mathcal{Z}_3 = \frac{1}{2\lambda} \sum_{z=a}^{b} e^{-\frac{\hat{N}-z}{\lambda}} \quad (38)$$

For case 2, the sum can be split into two pieces, the partial sums where all z are smaller or greater than N, respectively:

$$\mathcal{Z}_2 = \frac{1}{2\lambda} \left( \sum_{z=a}^{\lfloor \hat{N}+1/2 \rfloor - 1} e^{-\frac{\hat{N}-z}{\lambda}} + \sum_{z=\lfloor \hat{N}+1/2 \rfloor}^{b} e^{-\frac{z-\hat{N}}{\lambda}} \right) \quad (39)$$

The total partition function is as follows:

$$\mathcal{Z} = \frac{1}{2\lambda} \begin{cases} \sum_{z=a}^{b} e^{-\frac{z-\hat{N}}{\lambda}} & \hat{N} < a \\ \sum_{z=a}^{\lfloor \hat{N}+1/2 \rfloor - 1} e^{-\frac{\hat{N}-z}{\lambda}} + \sum_{z=\lfloor \hat{N}+1/2 \rfloor}^{b} e^{-\frac{z-\hat{N}}{\lambda}} & a \leq \hat{N} < b \\ \sum_{z=a}^{b} e^{-\frac{\hat{N}-z}{\lambda}} & \hat{N} \geq b \end{cases} \quad (40)$$

$$= \frac{1}{2\lambda} \begin{cases} e^{\frac{\hat{N}}{\lambda}} \sum_{z=a}^{b} e^{-\frac{z}{\lambda}} & \hat{N} < a \\ e^{-\frac{\hat{N}}{\lambda}} \sum_{z=a}^{\lfloor \hat{N}+1/2 \rfloor - 1} e^{\frac{z}{\lambda}} + e^{\frac{\hat{N}}{\lambda}} \sum_{z=\lfloor \hat{N}+1/2 \rfloor}^{b} e^{-\frac{z}{\lambda}} & a \leq \hat{N} < b \\ e^{-\frac{\hat{N}}{\lambda}} \sum_{z=a}^{b} e^{\frac{z}{\lambda}} & \hat{N} \geq b \end{cases} \quad (41)$$

The sums are all types of power series, as follows:

$$\sum_{k=0}^{n-1} r^k = \frac{1-r^n}{1-r} \quad |r| \neq 1 \quad (42)$$

$$\sum_{k=a}^{b-1} r^k = \sum_{k=0}^{b-1} r^k - \sum_{k=0}^{a-1} r^k \quad (43)$$

$$= \frac{1-r^b}{1-r} - \frac{1-r^a}{1-r} \quad (44)$$

$$= \frac{r^a - r^b}{1-r} \quad (45)$$

Therefore:

$$\mathcal{Z} = \frac{1}{2\lambda} \begin{cases} e^{\frac{\hat{N}}{\lambda}}\left(\frac{e^{-\frac{a}{\lambda}} - e^{-\frac{b+1}{\lambda}}}{1 - e^{-\frac{1}{\lambda}}}\right) & \hat{N} < a \\ e^{-\frac{\hat{N}}{\lambda}}\left(\frac{e^{\frac{a}{\lambda}} - e^{\frac{\lfloor \hat{N}+1/2 \rfloor}{\lambda}}}{1 - e^{\frac{1}{\lambda}}}\right) + e^{\frac{\hat{N}}{\lambda}}\left(\frac{e^{-\frac{\lfloor \hat{N}+1/2 \rfloor}{\lambda}} - e^{-\frac{b+1}{\lambda}}}{1 - e^{-\frac{1}{\lambda}}}\right) & a \le \hat{N} < b \\ e^{-\frac{\hat{N}}{\lambda}}\left(\frac{e^{\frac{a}{\lambda}} - e^{\frac{b+1}{\lambda}}}{1 - e^{\frac{1}{\lambda}}}\right) & \hat{N} \ge b \end{cases} \quad (46)$$

$$= \frac{1}{2\lambda} \begin{cases} e^{\frac{\hat{N}}{\lambda}}\left(\frac{e^{-\frac{a}{\lambda}} - e^{-\frac{b+1}{\lambda}}}{1 - e^{-\frac{1}{\lambda}}}\right) & \hat{N} < a \\ e^{-\frac{\hat{N}}{\lambda}}\left(\frac{-e^{-\frac{1}{\lambda}}}{-e^{-\frac{1}{\lambda}}}\right)\left(\frac{e^{\frac{a}{\lambda}} - e^{\frac{\lfloor \hat{N}+1/2 \rfloor}{\lambda}}}{1 - e^{\frac{1}{\lambda}}}\right) + e^{\frac{\hat{N}}{\lambda}}\left(\frac{e^{-\frac{\lfloor \hat{N}+1/2 \rfloor}{\lambda}} - e^{-\frac{b+1}{\lambda}}}{1 - e^{-\frac{1}{\lambda}}}\right) & a \le \hat{N} < b \\ e^{-\frac{\hat{N}}{\lambda}}\left(\frac{-e^{-\frac{1}{\lambda}}}{-e^{-\frac{1}{\lambda}}}\right)\left(\frac{e^{\frac{a}{\lambda}} - e^{\frac{b+1}{\lambda}}}{1 - e^{\frac{1}{\lambda}}}\right) & \hat{N} \ge b \end{cases} \quad (47)$$

$$\mathcal{Z} = \frac{1}{2\lambda} \frac{1}{1 - e^{-\frac{1}{\lambda}}} \begin{cases} e^{\frac{\hat{N}}{\lambda}}\left(e^{-\frac{a}{\lambda}} - e^{-\frac{b+1}{\lambda}}\right) & \hat{N} < a \\ -e^{-\frac{\hat{N}+1}{\lambda}}\left(e^{\frac{a}{\lambda}} - e^{\frac{\lfloor \hat{N}+1/2 \rfloor}{\lambda}}\right) + e^{\frac{\hat{N}}{\lambda}}\left(e^{-\frac{\lfloor \hat{N}+1/2 \rfloor}{\lambda}} - e^{-\frac{b+1}{\lambda}}\right) & a \le \hat{N} < b \\ -e^{-\frac{\hat{N}+1}{\lambda}}\left(e^{\frac{a}{\lambda}} - e^{\frac{b+1}{\lambda}}\right) & \hat{N} \ge b \end{cases} \quad (48)$$

$$= \frac{1}{2\lambda} \frac{1}{1 - e^{-\frac{1}{\lambda}}} \begin{cases} e^{-\frac{a-\hat{N}}{\lambda}} - e^{-\frac{a-\hat{N}+1}{\lambda}} & \hat{N} < a \\ e^{-\frac{\lfloor \hat{N}+1/2 \rfloor - \hat{N}}{\lambda}} + e^{-\frac{\lfloor \hat{N}+1/2 \rfloor - \hat{N}-1}{\lambda}} - e^{-\frac{b-\hat{N}+1}{\lambda}} - e^{-\frac{\hat{N}-a+1}{\lambda}} & a \le \hat{N} < b \\ e^{-\frac{\hat{N}-b}{\lambda}} - e^{-\frac{\hat{N}-a+1}{\lambda}} & \hat{N} \ge b \end{cases} \quad (49)$$

$$= \frac{1}{2\lambda} \frac{1}{1 - e^{-\frac{1}{\lambda}}} \begin{cases} e^{-\frac{a-\hat{N}}{\lambda}} - e^{-\frac{b-\hat{N}+1}{\lambda}} & \hat{N} < a \\ e^{-\frac{\xi}{\lambda}} + e^{-\frac{1-\xi}{\lambda}} - e^{-\frac{b-\hat{N}+1}{\lambda}} - e^{-\frac{\hat{N}-a+1}{\lambda}} & a \le \hat{N} < b \\ e^{-\frac{\hat{N}-b}{\lambda}} - e^{-\frac{\hat{N}-a+1}{\lambda}} & \hat{N} \ge b \end{cases} \quad (50)$$

$$= \frac{1}{2\lambda} \frac{1}{1 - e^{-\frac{1}{\lambda}}} \begin{cases} e^{-\frac{a-\hat{N}}{\lambda}} - e^{-\frac{b-\hat{N}+1}{\lambda}} & \hat{N} < a \\ e^{-\frac{\xi}{\lambda}} + e^{-\frac{1-\xi}{\lambda}} - e^{-\frac{b-\lfloor \hat{N}+1/2 \rfloor+1-\xi}{\lambda}} - e^{-\frac{\lfloor \hat{N}+1/2 \rfloor-a+\xi+1}{\lambda}} & a \le \hat{N} < b \\ e^{-\frac{\hat{N}-b}{\lambda}} - e^{-\frac{\hat{N}-a+1}{\lambda}} & \hat{N} \ge b \end{cases} \quad (51)$$

where $$L = \hat{N} - \left\lfloor \hat{N} + \frac{1}{2} \right\rfloor.$$

Next, factor out the largest term from each so log 1 p x can be utilized, as follows:

$$\mathcal{Z} = \frac{1}{2\lambda} \frac{1}{1 - e^{-\frac{1}{\lambda}}} \begin{cases} e^{-\frac{a-\hat{N}}{\lambda}}\left(1 - e^{-\frac{b-a+1}{\lambda}}\right) & \hat{N} < a \\ e^{-\frac{\xi}{\lambda}}\left(1 + e^{-\frac{1-2\xi}{\lambda}} - e^{-\frac{b-\lfloor \hat{N}+1/2 \rfloor+1-2\xi}{\lambda}} - e^{-\frac{\lfloor \hat{N}+1/2 \rfloor-a+1}{\lambda}}\right) & a \le \hat{N} < b \\ e^{-\frac{\hat{N}-b}{\lambda}}\left(1 - e^{-\frac{b-a+1}{\lambda}}\right) & N \ge b \end{cases} \quad (52)$$

Finally, $$\ln \mathcal{Z} = -\ln 2\lambda - \log 1 p\left(-e^{-\frac{1}{\lambda}}\right) + \begin{cases} -\frac{a - \hat{N}}{\lambda} + \log 1 p\left(-e^{-\frac{b-a+1}{\lambda}}\right) & \hat{N} < a \\ -\frac{\xi}{\lambda} + \log 1 p\left(e^{-\frac{1-2\xi}{\lambda}} - e^{-\frac{b-\lfloor \hat{N}+1/2 \rfloor+1-2\xi}{\lambda}} - e^{-\frac{\lfloor \hat{N}+1/2 \rfloor-a+1}{\lambda}}\right) & a \le N < b \\ -\frac{\hat{N} - b}{\lambda} + \log 1 p\left(-e^{-\frac{b-a+1}{\lambda}}\right) & \hat{N} \ge b \end{cases} \quad (53)$$

In some embodiments, the DPSM 128 can be configured to perform the disclosed DP-based techniques using the following generalized framework configurations.

In some aspects, the DPSM 128 is configured to include a framework used in connection with writing differentially private algorithms that attempt to reach an ($\alpha$, $\beta$)-accuracy target using the smallest possible ex-post privacy loss. The framework can be configured to use an adaptive process to refine the expected accuracy and gradual release to minimize the impact on the privacy loss. In some aspects, any algorithm that utilizes a Gaussian mechanism, or a composition of multiple Gaussian mechanisms, can be adapted to this framework.

In some aspects, the disclosed framework can be adapted for a large class of differentially private algorithms. In an example embodiment, the framework can be structured using the following three components:
  (a) An algorithm that is an application of the (multidimensional) Gaussian mechanism, optionally with a post-processing step (it can be used to compute a privatized statistic of interest).
  (b) The application of gradual release to the non-gradual Gaussian mechanism in the above algorithm with some budget schedule.
  (c) The post-processing stopping criterion, which estimates when the accuracy of the gradually released outputs is sufficient; the stopping criterion implicitly determines the accuracy target.

A pseudocode description of the generalized framework and the way it ties together the algorithms and methods described above is presented in Algorithm 1 in Table 2 below.

TABLE 2

Algorithm 1 Framework for generalized adaptive
algorithms with gradual release

Figure 12:
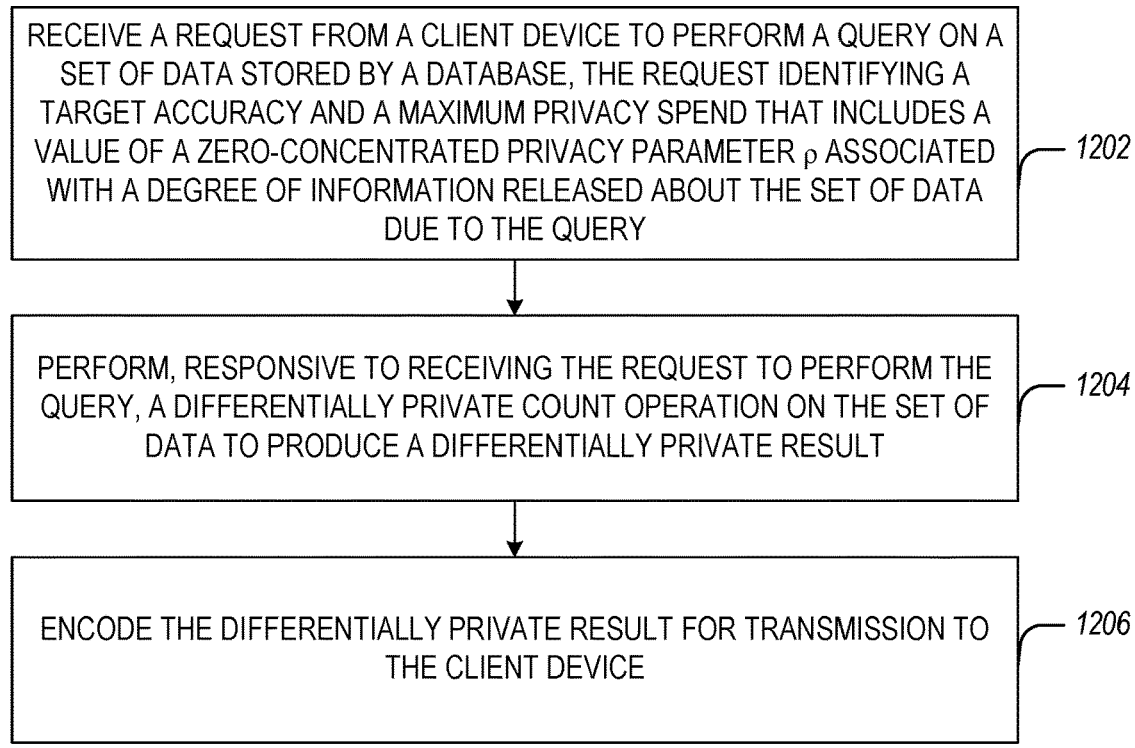
FIG. 12 is a flow diagram illustrating the operations of a database system in performing a method for processing a query with adaptive differential privacy, in accordance with some embodiments of the present disclosure.

Input:
    Dataset D ∈ 𝒟
    Mechanism A : 𝒟 → $R^+$ → $R^d$
    Budget schedule $\varepsilon_1 \leq \varepsilon_2 \leq ...$
    Post-processing step p : $R^d$ → $\vartheta$
    Stopping criteria predicate s : $R^d$ → $R^+$ → {false,true}
Output: $(x_i, i) \in \vartheta \times N$
i ← 1
Repeat
    if i = 1 then
        $\vec{x}_i \leftarrow A(D, \varepsilon_1)$
    else
        $\vec{x}_i \leftarrow$ RELAXPRIVACY$(\vec{x}_{i-1}, \varepsilon_{i-1}, \varepsilon_i)$
    i ← i + 1
until $s(\vec{x}_i, \varepsilon_i)$
return $(p(\vec{x}_i), i)$ FIG. 12 is a flow diagram illustrating the operations of a database system in performing method 1200 for processing a query with adaptive differential privacy, in accordance with some embodiments of the present disclosure. Method 1200 may be embodied in computer-readable instructions for execution by one or more hardware components (e.g., one or more processors) such that the operations of method 1200 may be performed by components of network-based database system 102, such as components of the compute service manager 108 (e.g., the DPSM 128) and/or the execution platform 110 (which components may be implemented as machine 1300 of FIG. 13). Accordingly, method 1200 is described below, by way of example with reference thereto. However, it shall be appreciated that method 1200 may be deployed on various other hardware configurations and is not intended to be limited to deployment within the network-based database system 102.

At operation 1202, a request is received by at least one hardware processor from a client device. The request is to perform a query on a set of data stored by a database. The request identifies a target accuracy and a maximum privacy spend. The target accuracy includes a maximum relative error. The maximum privacy spend includes a value of a zero-concentrated privacy parameter ρ associated with a degree of information released about the set of data due to the query.

At operation 1204, responsive to receiving the request to perform the query, a differentially private count operation is performed on the set of data to produce a differentially private result. The differentially private count operation includes performing a count operation on the set of data to produce a result. The differentially private count operation further includes perturbing the result to produce a differentially private result using a noise value sampled from a Gaussian distribution and based on a fractional privacy spend comprising a fraction of the maximum privacy spend. The differentially private count operation includes iteratively calibrating the noise value of the differentially private result using an inverse variance weighted averaging and additional samples from the Gaussian distribution and a new fractional privacy spend until at least one of an iteration uses the maximum privacy spend and a relative error of the differentially private result is determined to satisfy the target accuracy.

At operation 1206, the differentially private result is encoded for transmission to the client device.

Figure 13:
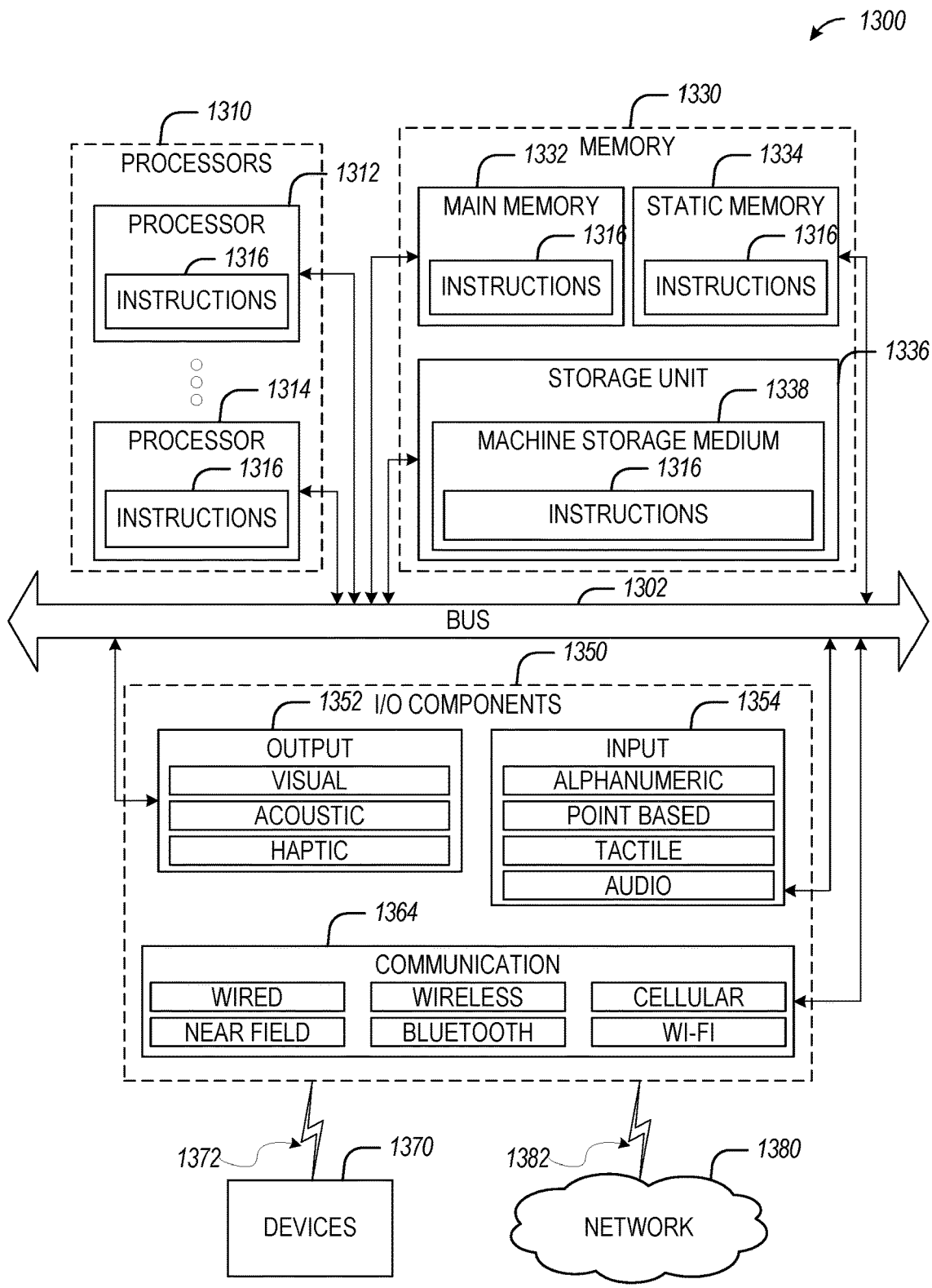
FIG. 13 illustrates a diagrammatic representation of a machine in the form of a computer system within which a set of instructions may be executed for causing the machine to perform any one or more of the methodologies discussed herein, in accordance with some embodiments of the present disclosure.

FIG. 13 illustrates a diagrammatic representation of machine 1300 in the form of a computer system within which a set of instructions may be executed for causing machine 1300 to perform any one or more of the methodologies discussed herein, according to an example embodiment. Specifically, FIG. 13 shows a diagrammatic representation of machine 1300 in the example form of a computer system, within which instructions 1316 (e.g., software, a program, an application, an applet, an app, or other executable code) for causing the machine 1300 to perform any one or more of the methodologies discussed herein may be executed. For example, instructions 1316 may cause machine 1300 to execute any one or more operations of method 1200 (or any other technique discussed herein, for example, in connection with FIG. 4-FIG. 12). As another example, instructions 1316 may cause machine 1300 to implement one or more portions of the functionalities discussed herein. In this way, instructions 1316 may transform a general, non-programmed machine into a particular machine 1300 (e.g., the compute service manager 108 or a node in the execution platform 110) that is specially configured to carry out any one of the described and illustrated functions in the manner described herein. In yet another embodiment, instructions 1316 may configure the compute service manager 108 and/or a node in the execution platform 110 to carry out any one of the described and illustrated functions in the manner described herein.

In alternative embodiments, machine 1300 operates as a standalone device or may be coupled (e.g., networked) to other machines. In a networked deployment, the machine 1300 may operate in the capacity of a server machine or a client machine in a server-client network environment or as a peer machine in a peer-to-peer (or distributed) network environment. Machine 1300 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

Machine 1300 includes processors 1310, memory 1330, and input/output (I/O) components 1350 configured to communicate with each other, such as via bus 1302. In some example embodiments, the processors 1310 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1312 and a processor 1314 that may execute the instructions 1316. The term "processor" is intended to include multi-core processors 1310 that may comprise two or more independent processors (sometimes referred to as "cores") that may execute instructions 1316 contemporaneously. Although FIG. 13 shows multiple processors 1310, machine 1300 may include a single processor with a single core, a single processor with multiple cores (e.g., a multi-core processor), multiple processors with a single core, multiple processors with multiple cores, or any combination thereof.

The memory 1330 may include a main memory 1332, a static memory 1334, and a storage unit 1336, all accessible to the processors 1310, such as via the bus 1302. The main memory 1332, the static memory 1334, and the storage unit 1336 store the instructions 1316, embodying any one or more of the methodologies or functions described herein. The instructions 1316 may also reside, wholly or partially, within the main memory 1332, within the static memory 1334, within machine storage medium 1338 of the storage unit 1336, within at least one of the processors 1310 (e.g., within the processor's cache memory), or any suitable combination thereof, during execution thereof by the machine 1300.

The I/O components 1350 include components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely to simplify the following discussion, and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1350 may include communication components 1364, operable to couple the machine 1300 to a network 1380 or devices 1370 via a coupling 1382 and a coupling 1372, respectively. For example, communication components 1364 may include a network interface component or another suitable device to interface with network 1380. In further examples, communication components 1364 may include wired communication components, wireless communication components, cellular communication components, and other communication components to provide communication via other modalities. The device 1370 may be another machine or any of a wide variety of peripheral devices (e.g., a peripheral device coupled via a universal serial bus (USB)). For example, as noted above, machine 1300 may correspond to any one of the compute service manager 108 or the execution platform 110, and device 1370 may include the client device 114 or any other computing device described herein as being in communication with the network-based database system 102 or the storage platform 104.

The various memories (e.g., 1330, 1332, 1334, and/or memory of the processor(s) 1310 and/or the storage unit 1336) may store one or more sets of instructions 1316 and data structures (e.g., software) embodying or utilized by any one or more of the methodologies or functions described herein. These instructions 1316, when executed by the processor(s) 1310, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database and/or associated caches and servers) that store executable instructions and/or data. The terms shall accordingly be taken to include, but not be limited to, solid-state memories and optical and magnetic media, including memory internal or external to processors. Specific examples of machine-storage media, computer-storage media, and device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1380 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 1380 or a portion of network 1380 may include a wireless or cellular network, and coupling 1382 may be a Code Division Multiple Access (CDMA) connection, a Global System for Mobile Communications (GSM) connection, or another cellular or wireless coupling. In this example, the coupling 1382 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1316 may be transmitted or received over network 1380 using a transmission medium via a network interface device (e.g., a network interface component included in the communication components 1364) and utilizing any one of several well-known transfer protocols (e.g., hypertext transfer protocol (HTTP)). Similarly, instructions 1316 may be transmitted or received using a transmission medium via coupling 1372 (e.g., a peer-to-peer coupling) to device 1370. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1316 for execution by the machine 1300 and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some embodiments, the processor or processors may be located in a single location (e.g., within a home environment, an office environment, or a server farm), while in other embodiments, the processors may be distributed across several locations.

Described implementations of the subject matter can include one or more features, alone or in combination, as illustrated below by way of examples.

Example 1 is a method comprising: receiving, by at least one hardware processor, a request from a client device to perform a query on a set of data stored by a database, the request identifying a target accuracy and a maximum privacy spend, the target accuracy comprising a maximum relative error, and the maximum privacy spend comprising a value of a zero-concentrated privacy parameter $\rho$ associated with a degree of information released about the set of data due to the query; performing, responsive to receiving the request to perform the query, a differentially private count operation on the set of data to produce a differentially private result, the differentially private count operation comprising: performing a count operation on the set of data to produce a result; perturbing the result to produce a differentially private result using a noise value sampled from a Gaussian distribution and based on a fractional privacy spend comprising a fraction of the maximum privacy spend associated with the zero-concentrated privacy parameter $\rho$; and iteratively calibrating the noise value of the differentially private result using an inverse variance weighted averaging and additional samples from the Gaussian distribution and a new fractional privacy spend until at least one of: an iteration uses the maximum privacy spend, and a relative error of the differentially private result is determined to satisfy the target accuracy; and encoding the differentially private result for transmission to the client device.

In Example 2, the subject matter of Example 1 includes subject matter where the iteratively calibrating the noise value of the differentially private result using the inverse variance weighted averaging and the additional samples from the Gaussian distribution comprises, for an iteration: generating the new fractional privacy spend larger than the fractional privacy spends of preceding iterations; generating a new noise value sampled from the Gaussian distribution using an unspent portion of the new fractional privacy spend; incorporating the new noise value into the differentially private result using inverse variance weighted averaging; and determining whether the differentially private result satisfies the target accuracy.

In Example 3, the subject matter of Example 2 includes subject matter where the determining whether the differentially private result satisfies the target accuracy comprises estimating the relative error of the differentially private result; and comparing the relative error to the target accuracy.

In Example 4, the subject matter of Examples 2-3 includes subject matter where the new fractional privacy spend is generated as a multiple of a preceding fractional privacy spend of a preceding iteration.

In Example 5, the subject matter of Examples 2-4 includes subject matter where the new fractional privacy spend is generated as a function of a difference between the target accuracy and a relative error of a differentially private result of a preceding iteration.

In Example 6, the subject matter of Examples 1-5 includes subject matter where iteratively calibrating the noise value of the differentially private result is responsive to the relative error of the differentially private result exceeding the target accuracy.

In Example 7, the subject matter of Examples 1-6 includes determining the relative error of the differentially private result based on a plug-in estimator.

In Example 8, the subject matter of Examples 1-7 includes determining the relative error of the differentially private result based on a Bayesian estimator.

Example 9 is a system comprising: at least one hardware processor; and at least one memory storing instructions that cause the at least one hardware processor to perform operations comprising: receiving a request from a client device to perform a query on a set of data stored by a database, the request identifying a target accuracy and a maximum privacy spend, the target accuracy comprising a maximum relative error, and the maximum privacy spend comprising a value of a zero-concentrated privacy parameter $\rho$ associated with a degree of information released about the set of data due to the query; performing, responsive to receiving the request to perform the query, a differentially private count operation on the set of data to produce a differentially private result, the differentially private count operation comprising: performing a count operation on the set of data to produce a result; perturbing the result to produce a differentially private result using a noise value sampled from a Gaussian distribution and based on a fractional privacy spend comprising a fraction of the maximum privacy spend associated with the zero-concentrated privacy parameter $\rho$; and iteratively calibrating the noise value of the differentially private result using an inverse variance weighted averaging and additional samples from the Gaussian distribution and a new fractional privacy spend until at least one of: an iteration uses the maximum privacy spend, and a relative error of the differentially private result is determined to satisfy the target accuracy; and encoding the differentially private result for transmission to the client device.

In Example 10, the subject matter of Example 9 includes subject matter where the operations for the iteratively calibrating the noise value of the differentially private result using the inverse variance weighted averaging and the additional samples from the Gaussian distribution comprise, for an iteration: generating the new fractional privacy spend larger than the fractional privacy spends of preceding iterations; generating a new noise value sampled from the Gaussian distribution using an unspent portion of the new fractional privacy spend; incorporating the new noise value into the differentially private result using inverse variance weighted averaging; and determining whether the differentially private result satisfies the target accuracy.

In Example 11, the subject matter of Example 10 includes subject matter where the operations for determining whether the differentially private result satisfies the target accuracy comprise estimating the relative error of the differentially private result; and comparing the relative error to the target accuracy.

In Example 12, the subject matter of Examples 10-11 includes subject matter where the new fractional privacy spend is generated as a multiple of a preceding fractional privacy spend of a preceding iteration.

In Example 13, the subject matter of Examples 10-12 includes subject matter where the new fractional privacy spend is generated as a function of a difference between the target accuracy and a relative error of a differentially private result of a preceding iteration.

In Example 14, the subject matter of Examples 9-13 includes subject matter where iteratively calibrating the noise value of the differentially private result is responsive to the relative error of the differentially private result exceeding the target accuracy.

In Example 15, the subject matter of Examples 9-14 includes the operations further comprising determining the relative error of the differentially private result based on a plug-in estimator.

In Example 16, the subject matter of Examples 9-15 includes the operations further comprising determining the relative error of the differentially private result based on a Bayesian estimator.

Example 17 is a computer-storage medium comprising instructions that, when executed by one or more processors of a machine, configure the machine to perform operations comprising: receiving a request from a client device to perform a query on a set of data stored by a database, the request identifying a target accuracy and a maximum privacy spend, the target accuracy comprising a maximum relative error, and the maximum privacy spend comprising a value of a zero-concentrated privacy parameter ρ associated with a degree of information released about the set of data due to the query; performing, responsive to receiving the request to perform the query, a differentially private count operation on the set of data to produce a differentially private result, the differentially private count operation comprising: performing a count operation on the set of data to produce a result; perturbing the result to produce a differentially private result using a noise value sampled from a Gaussian distribution and based on a fractional privacy spend comprising a fraction of the maximum privacy spend associated with the zero-concentrated privacy parameter p; and iteratively calibrating the noise value of the differentially private result using an inverse variance weighted averaging and additional samples from the Gaussian distribution and a new fractional privacy spend until at least one of: an iteration uses the maximum privacy spend, and a relative error of the differentially private result is determined to satisfy the target accuracy; and encoding the differentially private result for transmission to the client device.

In Example 18, the subject matter of Example 17 includes subject matter where the operations for the iteratively calibrating the noise value of the differentially private result using the inverse variance weighted averaging and the additional samples from the Gaussian distribution comprise, for an iteration: generating the new fractional privacy spend larger than the fractional privacy spends of preceding iterations; generating a new noise value sampled from the Gaussian distribution using an unspent portion of the new fractional privacy spend; incorporating the new noise value into the differentially private result using inverse variance weighted averaging; and determining whether the differentially private result satisfies the target accuracy.

In Example 19, the subject matter of Example 18 includes subject matter where the operations for determining whether the differentially private result satisfies the target accuracy comprise estimating the relative error of the differentially private result; and comparing the relative error to the target accuracy.

In Example 20, the subject matter of Examples 18-19 includes subject matter where the new fractional privacy spend is generated as a multiple of a preceding fractional privacy spend of a preceding iteration.

In Example 21, the subject matter of Examples 18-20 includes subject matter where the new fractional privacy spend is generated as a function of a difference between the target accuracy and a relative error of a differentially private result of a preceding iteration.

In Example 22, the subject matter of Examples 17-21 includes subject matter where iteratively calibrating the noise value of the differentially private result is responsive to the relative error of the differentially private result exceeding the target accuracy.

In Example 23, the subject matter of Examples 17-22 includes the operations further comprising determining the relative error of the differentially private result based on a plug-in estimator.

In Example 24, the subject matter of Examples 17-23 includes the operations further comprising determining the relative error of the differentially private result based on a Bayesian estimator.

Example 25 is at least one machine-readable medium including instructions that, when executed by processing circuitry, cause the processing circuitry to perform operations to implement any of Examples 1-24.

Example 26 is an apparatus comprising means to implement any of Examples 1-24.

Example 27 is a system to implement any of Examples 1-24.

Example 28 is a method to implement any of Examples 1-24.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
  receiving, by at least one hardware processor of a dedicated hardware device, a request from a client device to perform a query on a set of data stored by a database, the request received via a graphical user interface configured at the dedicated hardware device, the request identifying a target accuracy and a maximum privacy spend, the target accuracy comprising a maximum relative error, and the maximum privacy spend comprising a value of a zero-concentrated privacy parameter $\rho$ associated with a degree of information released about the set of data due to the query;
  transforming by a query handling engine configured at the dedicated hardware device, the query into one or more function calls compatible with the database;
  accessing via communication circuitry of the dedicated hardware device, a computing node that is external to the dedicated hardware device, the computing node housing the database with the set of data;
  invoking the one or more function calls to perform a differentially private count operation on the set of data to produce a differentially private result, the differentially private count operation comprising:
    performing a count operation on the set of data to produce a result;
    perturbing the result to produce a differentially private result using a noise value sampled from a Gaussian distribution and based on a fractional privacy spend comprising a fraction of the maximum privacy spend associated with the zero-concentrated privacy parameter $\rho$; and
    iteratively calibrating the noise value of the differentially private result using an inverse variance weighted averaging and additional samples from the Gaussian distribution and a new fractional privacy spend until at least one of:
      an iteration uses the maximum privacy spend; and
      a relative error of the differentially private result is determined to satisfy the target accuracy; and
  encoding by the communication circuitry of the dedicated hardware device, the differentially private result for transmission to the client device.

2. The method of claim 1, wherein the iteratively calibrating the noise value of the differentially private result using the inverse variance weighted averaging and the additional samples from the Gaussian distribution comprises, for an iteration:
  generating the new fractional privacy spend larger than the fractional privacy spends of preceding iterations;
  generating a new noise value sampled from the Gaussian distribution using an unspent portion of the new fractional privacy spend;
  incorporating the new noise value into the differentially private result using inverse variance weighted averaging; and
  determining whether the differentially private result satisfies the target accuracy.

3. The method of claim 2, wherein the determining whether the differentially private result satisfies the target accuracy comprises:
  estimating the relative error of the differentially private result; and
  comparing the relative error to the target accuracy.

4. The method of claim 2, wherein the new fractional privacy spend is generated as a multiple of a preceding fractional privacy spend of a preceding iteration.

5. The method of claim 2, wherein the new fractional privacy spend is generated as a function of a difference between the target accuracy and a relative error of a differentially private result of a preceding iteration.

6. The method of claim 1, wherein iteratively calibrating the noise value of the differentially private result is responsive to the relative error of the differentially private result exceeding the target accuracy.

7. The method of claim 1, further comprising:
  determining the relative error of the differentially private result based on a plug-in estimator.

8. The method of claim 1, further comprising:
  determining the relative error of the differentially private result based on a Bayesian estimator.

9. A system comprising:
  at least one hardware processor of a dedicated hardware device; and
  at least one memory storing instructions that cause the at least one hardware processor to perform operations comprising:
    receiving a request from a client device to perform a query on a set of data stored by a database, the request received via a graphical user interface configured at the dedicated hardware device, the request identifying a target accuracy and a maximum privacy spend, the target accuracy comprising a maximum relative error, and the maximum privacy spend comprising a value of a zero-concentrated privacy parameter $\rho$ associated with a degree of information released about the set of data due to the query;
    transforming by the dedicated hardware device, the query into one or more function calls compatible with the database;
    accessing via communication circuitry of the dedicated hardware device, a computing node that is external to the dedicated hardware device, the computing node housing the database with the set of data;

invoking the one or more function calls to perform a differentially private count operation on the set of data to produce a differentially private result, the differentially private count operation comprising:

performing a count operation on the set of data to produce a result;

perturbing the result to produce a differentially private result using a noise value sampled from a Gaussian distribution and based on a fractional privacy spend comprising a fraction of the maximum privacy spend associated with the zero-concentrated privacy parameter $\rho$; and iteratively calibrating the noise value of the differentially private result using an inverse variance weighted averaging and additional samples from the Gaussian distribution and a new fractional privacy spend until at least one of:

an iteration uses the maximum privacy spend; and a relative error of the differentially private result is determined to satisfy the target accuracy; and encoding by the communication circuitry of the dedicated hardware device, the differentially private result for transmission to the client device.

10. The system of claim 9, wherein the operations for the iteratively calibrating the noise value of the differentially private result using the inverse variance weighted averaging and the additional samples from the Gaussian distribution comprise, for an iteration:

generating the new fractional privacy spend larger than the fractional privacy spends of preceding iterations;

generating a new noise value sampled from the Gaussian distribution using an unspent portion of the new fractional privacy spend;

incorporating the new noise value into the differentially private result using inverse variance weighted averaging; and determining whether the differentially private result satisfies the target accuracy.

11. The system of claim 10, wherein the operations for the determining whether the differentially private result satisfies the target accuracy comprise:

estimating the relative error of the differentially private result; and comparing the relative error to the target accuracy.

12. The system of claim 10, wherein the new fractional privacy spend is generated as a multiple of a preceding fractional privacy spend of a preceding iteration.

13. The system of claim 10, wherein the new fractional privacy spend is generated as a function of a difference between the target accuracy and a relative error of a differentially private result of a preceding iteration.

14. The system of claim 9, wherein iteratively calibrating the noise value of the differentially private result is responsive to the relative error of the differentially private result exceeding the target accuracy.

15. The system of claim 9, the operations further comprising:

determining the relative error of the differentially private result based on a plug-in estimator.

16. The system of claim 9, the operations further comprising:

determining the relative error of the differentially private result based on a Bayesian estimator.

17. A computer-storage medium comprising instructions that, when executed by one or more processors of a dedicated hardware device, configure the dedicated hardware device to perform operations comprising:

receiving a request from a client device to perform a query on a set of data stored by a database, the request received via a graphical user interface configured at the dedicated hardware device, the request identifying a target accuracy and a maximum privacy spend, the target accuracy comprising a maximum relative error, and the maximum privacy spend comprising a value of a zero-concentrated privacy parameter $\rho$ associated with a degree of information released about the set of data due to the query;

transforming by a query handling engine configured at the dedicated hardware device, the query into one or more function calls compatible with the database;

accessing via communication circuitry of the dedicated hardware device, a computing node that is external to the dedicated hardware device, the computing node housing the database with the set of data;

invoking the one or more function calls to perform, a differentially private count operation on the set of data to produce a differentially private result, the differentially private count operation comprising:

performing a count operation on the set of data to produce a result;

perturbing the result to produce a differentially private result using a noise value sampled from a Gaussian distribution and based on a fractional privacy spend comprising a fraction of the maximum privacy spend associated with the zero-concentrated privacy parameter $\rho$; and iteratively calibrating the noise value of the differentially private result using an inverse variance weighted averaging and additional samples from the Gaussian distribution and a new fractional privacy spend until at least one of:

an iteration uses the maximum privacy spend; and a relative error of the differentially private result is determined to satisfy the target accuracy; and encoding by the communication circuitry of the dedicated hardware device, the differentially private result for transmission to the client device.

18. The computer-storage medium of claim 17, wherein the operations for the iteratively calibrating the noise value of the differentially private result using the inverse variance weighted averaging and the additional samples from the Gaussian distribution comprise, for an iteration:

generating the new fractional privacy spend larger than the fractional privacy spends of preceding iterations;

generating a new noise value sampled from the Gaussian distribution using an unspent portion of the new fractional privacy spend;

incorporating the new noise value into the differentially private result using inverse variance weighted averaging; and determining whether the differentially private result satisfies the target accuracy.

19. The computer-storage medium of claim 18, wherein the operations for the determining whether the differentially private result satisfies the target accuracy comprise:

estimating the relative error of the differentially private result; and comparing the relative error to the target accuracy.

20. The computer-storage medium of claim 18, wherein the new fractional privacy spend is generated as a multiple of a preceding fractional privacy spend of a preceding iteration.

21. The computer-storage medium of claim 18, wherein the new fractional privacy spend is generated as a function of a difference between the target accuracy and a relative error of a differentially private result of a preceding iteration.

22. The computer-storage medium of claim 17, wherein iteratively calibrating the noise value of the differentially private result is responsive to the relative error of the differentially private result exceeding the target accuracy.

23. The computer-storage medium of claim 17, the operations further comprising:
    determining the relative error of the differentially private result based on a plug-in estimator.

24. The computer-storage medium of claim 17, the operations further comprising:
    determining the relative error of the differentially private result based on a Bayesian estimator.

\* \* \* \* \*

UNITED STATES PATENT AND TRADEMARK OFFICE
CERTIFICATE OF CORRECTION

PATENT NO. : 12,314,418 B2
APPLICATION NO. : 18/497648
DATED : May 27, 2025
INVENTOR(S) : Damewood et al.

Page 1 of 1

It is certified that error appears in the above-identified patent and that said Letters Patent is hereby corrected as shown below:

In the Claims

In Column 42, Line 20, in Claim 17, delete "perform," and insert --perform-- therefor Signed and Sealed this
Twentieth Day of January, 2026

John A. Squires
*Director of the United States Patent and Trademark Office*